US012700581B2

(12) United States Patent
Wang

(10) Patent No.: US 12,700,581 B2
(45) Date of Patent: Aug. 4, 2026

(54) ELECTROCHEMICAL APPARATUS AND ELECTRONIC APPARATUS

(71) Applicant: Ningde Amperex Technology Limited, Ningde (CN)

(72) Inventor: Kefei Wang, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 577 days.

(21) Appl. No.: 17/708,302

(22) Filed: Mar. 30, 2022

(65) Prior Publication Data

US 2022/0223834 A1 Jul. 14, 2022

Related U.S. Application Data

(63) Continuation of application No. PCT/CN2021/114056, filed on Aug. 23, 2021.

(30) Foreign Application Priority Data

Oct. 15, 2020 (CN) ........................ 202011103536.8

(51) Int. Cl.

| | |
|---|---|
| ***H01M 4/13*** | (2010.01) |
| ***C07F 9/6574*** | (2006.01) |
| ***H01M 4/02*** | (2006.01) |
| ***H01M 4/66*** | (2006.01) |
| ***H01M 10/0525*** | (2010.01) |
| ***H01M 10/0567*** | (2010.01) |
| ***H01M 10/42*** | (2006.01) |

(52) U.S. Cl.

CPC ........... *H01M 4/13* (2013.01); *C07F 9/65746* (2013.01); *H01M 4/661* (2013.01); *H01M 4/666* (2013.01); *H01M 10/0525* (2013.01); *H01M 10/0567* (2013.01); *H01M 10/4235* (2013.01); *H01M 2004/021* (2013.01); *H01M 2004/027* (2013.01); *H01M 2220/30* (2013.01); *H01M 2300/0025* (2013.01)

(58) Field of Classification Search

CPC ..... C07F 9/65746; H01M 4/13; H01M 4/661; H01M 4/666; H01M 10/0525; H01M 10/0567; H01M 10/4235; H01M 2004/021; H01M 2004/027; H01M 2220/30; H01M 2300/0025

See application file for complete search history.

(56) References Cited

U.S. PATENT DOCUMENTS

2010/0216017 A1* 8/2010 Saito ................ H01M 10/0568 429/199
2010/0233534 A1 9/2010 Iwama et al.
2013/0244086 A1 9/2013 Iriyama et al.
2013/0260242 A1* 10/2013 Kawanaka ........... H01M 4/134 429/218.1
2015/0086852 A1 3/2015 Matsuno et al.
2016/0099468 A1 4/2016 Anapolsky
2016/0248077 A1* 8/2016 Momo ................ H01M 4/0452
2016/0285076 A1* 9/2016 Yamamoto ........... H01M 4/625
2018/0076488 A1* 3/2018 Shi .................... H01M 10/0525
2018/0226655 A1* 8/2018 Arai ....................... C25D 5/611
2019/0280297 A1* 9/2019 Otsuki .................. H01M 4/587

FOREIGN PATENT DOCUMENTS

CN 101834309 A 9/2010
CN 103367700 A 10/2013
CN 103917683 B 2/2016
CN 108400338 A 8/2018
CN 109980225 A 7/2019
CN 110247114 A 9/2019
CN 110265629 A 9/2019
CN 111600074 A * 8/2020 ........ H01M 10/0525
CN 111769328 A * 10/2020 ........ H01M 10/0525
CN 112151752 A 12/2020
JP 2000303128 A 10/2000
JP 2012054198 A 3/2012
JP 2013229306 A 11/2013
JP 2015059266 A 3/2015
JP 2016106346 A 6/2016
JP 2018514070 A 5/2018
JP 2019012709 A 1/2019
JP 2019160782 A 9/2019
KR 20200104772 A * 9/2020
KR 1020200104772 A 9/2020

OTHER PUBLICATIONS

KR20200104772A Machine Translation (Year: 2020).*
CN-111600074-A Machine Translation.*
CN-111769328-A Machine Translation.*
Office Action issued on Dec. 27, 2023, in corresponding Chinese Application No. 202011103536.8, 20 pages.
Office Action issued on Feb. 28, 2023, in corresponding Japanese Application No. 2022-502603, 18 pages.
International Search Report issued on Oct. 26, 2021 in corresponding International Patent Application No. PCT/CN2021/114056; 4 pages.
Office Action issued on Jul. 22, 2024, in corresponding Korean Application No. 10-2022-7006609, 16 pages.

* cited by examiner

*Primary Examiner* — Brian R Ohara
*Assistant Examiner* — Quintin D. Elliott
(74) *Attorney, Agent, or Firm* — Maier & Maier, PLLC

(57) ABSTRACT

An electrochemical apparatus, including a positive electrode, a negative electrode, and an electrolyte. The negative electrode includes a negative electrode current collector and a negative electrode active substance layer formed on the negative electrode current collector. The negative electrode current collector has a high tensile strength and the negative electrode active substance layer has a specific weight. The electrochemical apparatus has improved high-temperature storage expansion performance and cyclic expansion performance.

13 Claims, No Drawings

ELECTROCHEMICAL APPARATUS AND ELECTRONIC APPARATUS

CROSS REFERENCE TO RELATED APPLICATIONS

This application is a Bypass Continuation application of PCT international application: PCT/CN2021/114056, filed on Aug. 23, 2021, which claims the benefit of priority from the China Patent Application No. 202011103536.8, filed on Oct. 15, 2020, the disclosures of which are hereby incorporated by reference in its entirety.

TECHNICAL FIELD

This application relates to the field of energy storage, specifically to an electrochemical apparatus and an electronic apparatus, and in particular to a lithium-ion battery.

BACKGROUND

With the development of technologies and increasing demands for mobile apparatuses, people impose increasing requirements on the endurance time of the electrochemical apparatuses (for example, lithium-ion batteries). When the endurance time of lithium-ion batteries is improved, a higher requirement is imposed on their performance, especially their high-temperature storage swelling performance and cycle swelling performance of.

In view of this, it is necessary to provide an electrochemical apparatus and an electronic apparatus that have improved performance.

SUMMARY

Embodiments of this application provide an electrochemical apparatus and an electronic apparatus that have improved high-temperature storage swelling performance and cycle swelling performance, so as to resolve at least one problem existing in the related fields to at least some extent.

According to one aspect of this application, this application provides an electrochemical apparatus, including a positive electrode, a negative electrode, and an electrolyte, where the negative electrode includes a negative electrode current collector and a negative electrode active substance layer formed on the negative electrode current collector. The negative electrode current collector has a tensile strength of F $N/mm^2$, where F is greater than 400; and a weight per unit area of the negative electrode active substance layer is W $mg/cm^2$, where W is within a range of 3 to 12.

According to an embodiment of this application, the negative electrode current collector includes copper.

According to an embodiment of this application, the negative electrode current collector includes a first metal, the first metal includes at least one of silver or tin, and based on the weight of the negative electrode current collector, a content percentage of the first metal is a %, where a is within a range of 0.01 to 0.5.

According to an embodiment of this application, the negative electrode current collector further includes at least one rare earth element.

According to an embodiment of this application, $4 \leq F \times a \leq 200$.

According to an embodiment of this application, $100/3 \leq F/W \leq 200$.

According to an embodiment of this application, a density of the negative electrode active substance layer is D $g/cm^3$, D is within a range of 1.4 to 2.0, and F and D satisfy $560 \leq F \times D \leq 1200$.

According to an embodiment of this application, the negative electrode current collector has at least one of the following characteristics:

1) an average surface roughness is 0.05 μm to 1.5 μm;

2) a 0.2% endurance is greater than 30 $N/mm^2$; or 3) a thickness is 1 μm to 100 μm.

According to an embodiment of this application, the negative electrode active substance layer has at least one of the following characteristics:

a) a reflectance Ra at a wavelength of 550 nm is 7% to 15%; or b) a porosity Pa is 20% to 40%.

According to an embodiment of this application, the electrolyte further includes at least one of the following compounds:

i. propionate;

ii. a compound having cyano group iii. lithium difluorophosphate; or iv a compound of Formula 1

Formula 1

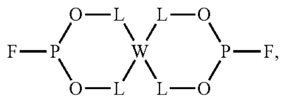

where:

W is

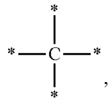,

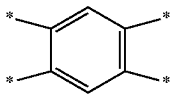,

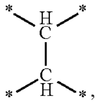, or

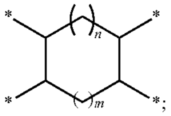;

each L is independently a single bond or methylene;

m is 1, 2, 3, or 4; and n is 0, 1, or 2.

According to an embodiment of this application, the compound of Formula 1 includes at least one of the following compounds:

Formula 1-1

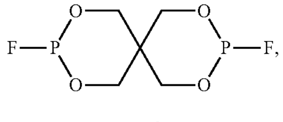, or

Formula 1-2

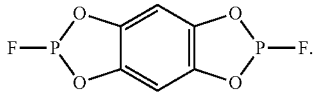.

According to an embodiment of this application, based on a weight of the electrolyte, a content percentage of the compound having cyano group is b % and b is within a range of 0.01 to 10.

According to an embodiment of this application, $1 \leq b/a \leq 300$.

According to an embodiment of this application, $0.5 \leq W/b \leq 24$.

According to another aspect of this application, this application provides an electronic apparatus, including the electrochemical apparatus according to this application.

Additional aspects and advantages of the embodiments of this application are partially described and presented in subsequent descriptions, or explained by implementation of the embodiments of this application.

DETAILED DESCRIPTION

Embodiments of this application will be described in detail below. The embodiments of this application should not be interpreted as any limitation on this application.

Unless otherwise expressly indicated, the following terms used in this specification have the meanings described below.

In specific embodiments and claims, a list of items connected by the term "at least one of" may mean any combination of the listed items. For example, if Item A and Item B are listed, the phrase "at least one of A and B" means only A, only B, or both A and B. In another example, if Item A, Item B, and Item C are listed, the phrase "at least one of A, B, and C" means only A, only B, only C, A and B (excluding C), A and C (excluding B), B and C (excluding A), or all of A, B, and C. Item A may include one element or a plurality of elements. Item B may include one element or a plurality of elements. Item C may include one element or a plurality of elements. The term "at least one type of" has the same meaning as the term "at least one of".

As used in this specification, the term "alkyl group" is intended to be a linear saturated hydrocarbon structure having 1 to 20 carbon atoms. "Alkyl" is also intended to be a branched or cyclic hydrocarbon structure having 3 to 20 carbon atoms. When an alkyl group having a specific carbon number is specified, all geometric isomers having that carbon number are intended to be covered. Therefore, for example, "a butyl group" means to include an n-butyl group, a sec-butyl group, an isobutyl group, a tert-butyl group, and a cyclobutyl group; and "a propyl group" includes an n-propyl group, an isopropyl group, and a cyclopropyl group. Examples of the alkyl group include, but are not limited to, a methyl group, an ethyl group, an n-propyl group, an isopropyl group, an cyclopropyl group, an n-butyl group, an isobutyl group, a sec-butyl group, a tert-butyl group, a cyclobutyl group, an n-pentyl group, an isopentyl group, a neopentyl group, a cyclopentyl group, a methylcyclopentyl group, an ethylcyclopentyl group, an n-hexyl group, an isohexyl group, a cyclohexyl group, an n-heptyl group, an octyl group, a cyclopropyl group, a cyclobutyl group, a norbornyl group, and the like.

As used in this specification, the term "halogenated" means that hydrogen atoms in a group are partially or entirely substituted with halogen atoms (for example, fluorine, chlorine, bromine, or iodine).

With the development of technologies and increasing use demands, people impose higher requirements on the endurance time of the electrochemical apparatuses (for example, lithium-ion batteries). With the longer endurance time, higher requirements are imposed on the performance of the lithium-ion batteries, especially the high-temperature storage swelling performance and the cycle swelling performance of the lithium-ion batteries.

In order to resolve the foregoing problems, in this application, a negative electrode current collector having a high tensile strength and a negative electrode active substance layer having a specific weight are used to prevent the negative electrode from breaking under a high-temperature working condition, so that the electrochemical apparatus makes full use of its capacity. This significantly improves the high-temperature storage swelling performance and the cycle swelling performance of the electrochemical apparatus.

In an embodiment, this application provides an electrochemical apparatus, including a positive electrode, a negative electrode, and an electrolyte as described below.

I. Negative Electrode

The negative electrode includes a negative electrode current collector and a negative electrode active substance layer disposed on one or both surfaces of the negative electrode current collector.

1. Negative Electrode Current Collector

As used in this specification, the term "tensile strength" refers to a ratio of the maximum tensile force required when a test sample is broken to a cross-sectional area of the test sample.

One characteristic of the electrochemical apparatus in this application is that a tensile strength of the negative electrode current collector is F $N/mm^2$ and F is greater than 400. In some embodiments, F is greater than 450. In some embodiments, F is greater than 500. In some embodiments, F is greater than 550. In some embodiments, F is greater than 600. In some embodiments, F is greater than 650. In some embodiments, F is greater than 700. In some embodiments, F is greater than 800. In some embodiments, F is greater than 900. In some embodiments, F is greater than 1000.

A high tensile strength of the negative electrode current collector can be implemented by doping a specific element in the negative electrode current collector. Using the negative electrode current collector having a high tensile strength can suppress cracking of the negative electrode current collector resulting from swelling/contraction of the negative electrode active substance layer during charging/discharging of the electrochemical apparatus, thereby significantly improving the high-temperature storage swelling performance and the cycle swelling performance of the electrochemical apparatus.

The tensile strength of the negative electrode current collector may be measured by using the same apparatus and method that are used for determining an elongation (refer to the GB-228-87 test method).

In some embodiments, the form of the negative electrode current collector may include, but is not limited to, a metal foil, a metal cylinder, a metal coil, a metal plate, a metal film, a metal plate mesh, a punched metal, a foamed metal, and the like. In some embodiments, the negative electrode current collector is a metal foil. In some embodiments, the metal foil is a mesh.

In some embodiments, the negative electrode current collector includes copper.

In some embodiments, the negative electrode current collector is a copper foil. As used in this specification, the term "copper foil" includes a copper alloy foil.

In some embodiments, the negative electrode current collector includes at least one of tough pitch copper or oxygen-free copper. As used in this specification, the term "tough pitch copper" includes a copper alloy foil with a substance of tough pitch copper, and the term "oxygen-free copper" includes a copper alloy foil with a substance of oxygen-free copper.

In some embodiments, the tough pitch copper complies with the JIS-H3100-C1100 standard. In some embodiments, the oxygen-free copper complies with the JIS-H3100-C1020 standard. The tough pitch copper or oxygen-free copper complying with the foregoing standards has a composition close to that of pure copper, and features good electrical conductivity and is particularly suitable for use as the negative electrode current collector.

In some embodiments, the oxygen content (based on copper) in the tough pitch copper is 0.01% to 0.02%. In some embodiments, the oxygen content (based on copper) in the tough pitch copper is below 0.001%.

In some embodiments, the negative electrode current collector includes a first metal, the first metal includes at least one of silver or tin, and based on the weight of the negative electrode current collector, a content percentage of the first metal is a %, where a is within a range of 0.01 to 0.5. In some embodiments, a is within a range of 0.05 to 0.4. In some embodiments, a is within a range of 0.1 to 0.3. In some embodiments, a is 0.01, 0.05, 0.1, 0.2, 0.3, 0.4, 0.5, or within a range between any two of the foregoing values. When the content of the first metal in the negative electrode current collector is within the range of 0.01% to 0.5%, oxidation of the surface of the negative electrode current collector is suppressed, so that the negative electrode current collector has good electrical conductivity. In addition, during preparation of the negative electrode, the negative electrode current collector can be recrystallized during the drying step after coating of the negative electrode active substance layer, thereby further improving the high-temperature storage swelling performance and the cycle swelling performance of the electrochemical apparatus.

In some embodiments, the negative electrode current collector further includes at least one rare earth element.

In some embodiments, the rare earth element includes at least one of indium, yttrium, scandium, titanium, or vanadium.

In some embodiments, the copper foil includes an impurity, and the impurity includes at least one of P, Fe, Zr, Mg, S, Ge, or Ti. In some embodiments, the content of the impurity is below 20 ppm based on the weight of the copper foil. When content percentage of the impurity in the copper foil falls within the foregoing range, the copper foil is less prone to bending and deformation, thereby reducing crystal orientation rotation and avoiding generation of shear bands, and helping improve the fracture-proof property of the negative electrode current collector.

In some embodiments, the tensile strength F $N/mm^2$ of the negative electrode current collector and the content a % of the first metal in the negative electrode current collector satisfy: $4 \le F \times a \le 200$. In some embodiments, $5 \le F \times a \le 150$. In some embodiments, $10 \le F \times a \le 100$. In some embodiments, $20 \le F \times a \le 50$. In some embodiments, $F \times a$ is 4, 5, 10, 20, 30, 40, 50, 60, 70, 80, 90, 100, 110, 120, 130, 140, 150, 160, 170, 180, 190, 200, or within a range between any two of the foregoing values. When the tensile strength F $N/mm^2$ of the negative electrode current collector and the content a % of the first metal in the negative electrode current collector satisfy the foregoing relationship, the high-temperature storage swelling performance and the cycle swelling performance of the electrochemical apparatus can be further improved.

In some embodiments, the negative electrode current collector has at least one of the following characteristics (1) to (3):

(1) Average Surface Roughness

In some embodiments, the average surface roughness of the negative electrode current collector is 0.05 μm to 1.5 μm. In some embodiments, the average surface roughness of the negative electrode current collector is 0.1 μm to 1.3 μm. In some embodiments, the average surface roughness of the negative electrode current collector is 0.15 μm to 1.0 μm. In some embodiments, the average surface roughness of the negative electrode current collector is 0.2 μm to 0.8 μm. In some embodiments, the average surface roughness of the negative electrode current collector is 0.3 μm to 0.5 μm. In some embodiments, the average surface roughness of the negative electrode current collector is 0.05 μm, 0.1 μm, 0.3 μm, 0.5 μm, 0.8 μm, 1 μm, 1.3 μm, 1.5 μm, or within a range between any two of the foregoing values. When the average surface roughness of the negative electrode current collector falls within the foregoing range, the interface area between the negative electrode current collector and the negative electrode active substance layer increases and the adhesion between the negative electrode current collector and the negative electrode active substance improves, thereby helping improve the high-temperature storage swelling performance and the cycle swelling performance of the electrochemical apparatus.

The average surface roughness of the negative electrode current collector may be measured by using the method described in ISO1302:2002.

(2) 0.2% Endurance

As used in this specification, the term "0.2% endurance" refers to an amount of load required for producing 0.2% plastic deformation (namely, permanent deformation) of the test sample. To be specific, after the load is applied to cause 0.2% plastic deformation of the test sample, the test sample remains 0.2% plastic deformation even when the load is removed.

In some embodiments, the 0.2% endurance of the negative electrode current collector is greater than 30 $N/mm^2$. In some embodiments, the 0.2% endurance of the negative electrode current collector is greater than 50 $N/mm^2$. In some embodiments, the 0.2% endurance of the negative electrode current collector is greater than 100 $N/mm^2$. In some embodiments, the 0.2% endurance of the negative electrode current collector is greater than 150 $N/mm^2$. In some embodiments, the 0.2% endurance of the negative electrode current collector is greater than 200 $N/mm^2$. In some embodiments, the 0.2% endurance of the negative electrode current collector is greater than 300 $N/mm^2$. When the 0.2% endurance of the negative electrode current collector falls within the foregoing range, cracking of the negative electrode current collector caused by swelling or contraction of the negative electrode active substance layer during charging/discharging of the electrochemical apparatus can be suppressed, thereby improving the high-temperature storage swelling performance and the cycle swelling performance.

The 0.2% endurance of the negative electrode current collector may be measured by using the same apparatus and method that are used for determining an elongation (refer to the GB-228-87 test method).

(3) Thickness

In some embodiments, the thickness of the negative electrode current collector is 1 μm to 100 μm. In some embodiments, the thickness of the negative electrode current collector is 3 μm to 80 μm. In some embodiments, the thickness of the negative electrode current collector is 5 μm to 50 μm. In some embodiments, the thickness of the negative electrode current collector is 10 μm to 30 m. In some embodiments, the thickness of the negative electrode current collector is 15 μm to 20 μm. In some embodiments, the thickness of the negative electrode current collector is 1 μm, 3 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, or within a range between any two of the foregoing values. When the thickness of the negative electrode current collector is within the foregoing range, the negative electrode current collector has a high strength and is easy for coating, and the shape of the negative electrode is less prone to deformation such as curling.

2. Negative Electrode Active Substance Layer

The negative electrode active substance layer contains a negative electrode active substance. The negative electrode active substance layer may be one or more layers, and each of the plurality of layers of the negative electrode active substance may contain the same or different negative electrode active substances. The negative electrode active substance is any material capable of reversibly intercalating and deintercalating metal ions such as lithium ions. In some embodiments, a rechargeable capacity of the negative electrode active substance is greater than a discharge capacity of the positive electrode active substance to prevent lithium metal from accidentally precipitating onto the negative electrode during charging.

Another characteristic of the electrochemical apparatus in this application is that the weight per unit area of the negative electrode active substance layer is W $mg/cm^2$, where W is in a range of 3 to 12. In some embodiments, W is within a range of 5 to 10. In some embodiments, W is within a range of 6 to 8. In some embodiments, W is 3, 4, 5, 6, 7, 8, 9, 10, 11, 12, or within a range between any two of the foregoing values. When the weight per unit area of the negative electrode active substance layer falls within the foregoing range, permeability of the electrolyte in the vicinity of the interface between the negative electrode current collector and the negative electrode active substance layer can be improved, and electron transport in the electrochemical apparatus is improved. In addition, impact on the active substance layer during processing can be reduced, so as to keep a good interface between the negative electrode current collector and the negative electrode active substance layer and reduce relative displacement between the negative electrode active substances, thereby improving the high-temperature storage swelling performance and the cycle swelling performance of the electrochemical apparatus.

In some embodiments, the tensile strength F $N/mm^2$ of the negative electrode current collector and the weight per unit area W $mg/cm^2$ of the negative electrode active substance layer satisfy: $100/3 \le F/W \le 200$. In some embodiments, $40 \le F/W \le 150$. In some embodiments, $50 \le F/W \le 100$. In some embodiments, $60 \le F/W \le 80$. In some embodiments, F/W is 100/3, 40, 50, 60, 70, 80, 90, 100, 110, 120, 130, 140, 150, 160, 170, 180, 190, 200, or within a range between any two of the foregoing values. When the tensile strength F $N/mm^2$ of the negative electrode current collector and the weight per unit area W $mg/cm^2$ of the negative electrode active substance layer satisfy the foregoing relationship, the high-temperature storage swelling performance and the cycle swelling performance of the electrochemical apparatus can be further improved.

The weight per unit area of the negative electrode active substance layer in this application is a ratio of the mass (mg) of the negative electrode active substance layer to an area ($cm^2$) of the active substance layer. The mass and the area of the negative electrode active substance layer are obtained by using the following method: cutting a test piece of an appropriate size from the negative electrode, measuring the area S1 and the mass W0 of the test piece, removing the negative electrode current collector from the negative electrode, measuring the mass W1 of the negative electrode current collector, and calculating the mass of the negative electrode active substance layer based on (W0−W1), if the selected negative electrode has a single-sided active substance layer, the weight per unit area is (W0−W1)/S1. If the selected negative electrode has a double-sided active substance layer, the weight per unit area is (W0−W1)/S1/2.

Examples of the method for removing the negative electrode active substance layer include a method of immersing the negative electrode active substance layer in a solvent capable of dissolving or swelling the negative electrode active substance layer, a method of wiping off the active substance layer with a cloth or the like, and other methods.

The weight per unit area of the negative electrode active substance layer can be adjusted by using a known method. For example, in a case in which the negative electrode active substance layer is formed by coating, the weight per unit area of the negative electrode active substance layer can be adjusted by changing a concentration of a solid content in a coating liquid for forming the negative electrode active substance layer, a quantity of coating times, a gap of a liquid inlet of a coating machine, and the like. The weight per unit area of the negative electrode active substance layer can be increased by increasing the concentration of the solid content, increasing the quantity of coating times, or enlarging the gap. The weight per unit area of the negative electrode active substance layer can be decreased by decreasing the concentration of the solid content, reducing the quantity of coating times, or narrowing the gap.

In some embodiments, the density of the negative electrode active substance layer is D $g/cm^3$, and D is within a range of 1.4 to 2.0. In some embodiments, D is within a range of 1.5 to 1.8. In some embodiments, D is 1.4, 1.5, 1.6, 1.7, 1.8, 1.9, 2.0, or within a range between any two of the foregoing values. When the density of the negative electrode active substance layer falls within the foregoing range, the negative electrode active substance is less prone to damages and can maintain a relatively low initial irreversible capacity, to maintain high electrical conductivity between the negative electrode active substances. In addition, permeability of the electrolyte in the vicinity of the interface between the negative electrode current collector and the negative electrode active substance layer can be improved, thereby helping improve the high-temperature storage swelling performance and the cycle swelling performance of the electrochemical apparatus.

In some embodiments, the tensile strength F $N/mm^2$ of the negative electrode current collector and the density D $g/cm^3$ of the negative electrode active substance layer satisfy: $560 \le F \times D \le 1200$. In some embodiments, $600 \le F \times D \le 1000$. In some embodiments, $700 \le F \times D \le 800$. In some embodiments, F×D is 560, 600, 650, 700, 750, 800, 850, 900, 950, 1000, 1050, 1100, 1150, 1200, or within a range between any two of the foregoing values. When the tensile strength F $N/mm^2$ of the negative electrode current collector and the density D $g/cm^3$ of the negative electrode active substance layer satisfy the foregoing relationship, the high-temperature storage swelling performance and the cycle swelling performance of the electrochemical apparatus can be further improved.

In some embodiments, the negative electrode active substance layer has at least one of the following characteristics (a) or (b):

(a) Reflectance

The reflectance of the negative electrode active substance layer may reflect smoothness of the surface of the negative electrode active substance layer and a compressed state of the surface of the negative electrode active substance. The reflectance of the negative electrode active substance layer may be controlled based on a type of the negative electrode active substance, a forming condition of the negative electrode active substance layer, and a post-treatment process after forming, or may be controlled based a rolling force applied during rolling of the negative electrode, a quantity of rolling times, a heating condition during rolling, a rolling plate used for rolling, and a material and a surface shape of a roller.

In some embodiments, the reflectance Ra of the negative electrode active substance layer at a wavelength of 550 nm is 7% to 15%. In some embodiments, the reflectance Ra of the negative electrode active substance layer at a wavelength of 550 nm is 8% to 14.8%. In some embodiments, the reflectance Ra of the negative electrode active substance layer at a wavelength of 550 nm is 10% to 12%. In some embodiments, the reflectance Ra of the negative electrode active substance layer at a wavelength of 550 nm is 7%, 8%, 9%, 10%, 11%, 12%, 13%, 14%, 15%, or within a range between any two of the foregoing values. When the reflectance of the negative electrode active substance layer falls within the foregoing range, side reaction on the surface of the negative electrode active substance layer can be suppressed, and permeatability of the electrolyte from the surface of the negative electrode active substance layer to the inside of the negative electrode active substance layer can be enhanced, thereby improving the fast charging property of the electrochemical apparatus.

The reflectance of the negative electrode active substance layer can be measured by using a commercially available spectral colorimeter (for example, SPECTRO PHOTOMETER CM-5 manufactured by KONICAMINOLTA).

(b) Porosity

In some embodiments, the porosity Pa of the negative electrode active substance layer is 20% to 40%. In some embodiments, the porosity Pa of the negative electrode active substance layer is 26.5% to 31.3%. In some embodiments, the porosity Pa of the negative electrode active substance layer is 26% to 31%. In some embodiments, the porosity Pa of the negative electrode active substance layer is 20%, 22%, 24%, 26%, 28%, 30%, 32%, 34%, 36%, 38%, 40%, or within a range between any two of the foregoing values.

The porosity of the negative electrode active substance layer can be measured by using the following method: punching the negative electrode into small discs of 13 mm by using a puncher and measuring the thickness of the small discs using a ten-thousandth micrometer; placing a specific quantity of small discs in a sample chamber of the AccuPyc 1340 instrument, blowing the samples with helium for 30 times, injecting helium according to the procedure, testing a pressure inside the sample chamber, and calculating a true volume in the sample chamber based on Boyles law: PV=nRT; after the test, counting the quantity of small discs and calculating an apparent volume of the samples; and calculating a porosity of the sample based on the following formula:

$$\text{Porosity}=1-\text{True volume}/\text{Apparent volume}.$$

Negative Electrode Active Substance

In some embodiments, the negative electrode active substance includes, but is not limited to, carbon materials such as graphite, hard carbon, soft carbon, and MCMB, silicon, a silicon-containing compound such as a silicon oxide represented by $SiO_x$ ($0<x<2$), metallic lithium, a metal that forms an alloy with lithium and an alloy thereof, an amorphous compound based on an oxide such as tin dioxide, and lithium titanate ($Li_4Ti_5O_{12}$).

In some embodiments, the negative electrode active substance includes a carbon material. In some embodiments, the negative electrode active substance includes a carbon material having a graphite structure. In some embodiments, the negative electrode active substance is at least one of artificial graphite or natural graphite.

In some embodiments, the negative electrode active substance includes different compositions, and a carbon material having a graphite structure is dominant. In some embodiments, based on the weight of the negative electrode active substance layer, the content of carbon material having the graphite structure is greater than 70.0%. In some embodiments, based on the weight of the negative electrode active substance layer, the content of the carbon material having the graphite structure is greater than 90.0%. Based on the weight of the negative electrode active substance layer, the content of the carbon material having the graphite structure is greater than 95.0%.

In some embodiments, metals that form alloys with metal lithium include, but are not limited to, aluminum, silicon, tin, germanium, and the like.

In some embodiments, the negative electrode active substance is a metal or semi-metal, represented by silicon, that forms an alloy with lithium and an alloy thereof, and the metal or semi-metal has a high charge and discharge capacity.

In some embodiments, the negative electrode active substance include a mixture of a metal or semi-metal, represented by silicon, that forms an alloy with lithium and an alloy thereof, and a carbon material having a graphite structure.

Binder

In some embodiments, the negative electrode active substance layer further includes the negative electrode binder. The negative electrode binder can improve binding between particles of the negative electrode active substance and binding between the negative electrode active substance layer and the negative electrode current collector. The type of the negative electrode binder is not particularly limited provided that the binder is a material that is stable to the electrolyte or the solvent used in manufacturing of the electrode.

Examples of the negative electrode binder include, but are not limited to, a resin-based polymer such as polyethylene, polypropylene, polyethylene glycol terephthalate, polymethyl methacrylate, aromatic polyamide, cellulose, or nitrocellulose; a rubber polymer such as SBR (styrene-butadiene rubber), isoprene rubber, butadiene rubber, fluorine rubber, NBR (acrylonitrile butadiene rubber), or styrene-acrylic rubber; styrene butadiene styrene block copolymer or hydride thereof, a thermoplastic elastomeric polymer such as EPDM (ethylene propylene diene terpolymer), styrene ethylene butadiene styrene copolymer, styrene-isobutylene-styrene block copolymer or hydride thereof, a soft resinous polymer such as syndiotactic1.2-polybutadiene, polyvinyl acetate, ethylene vinyl acetate copolymer, propylene α-olefin copolymer; a fluorine polymer such as polyvinylidene fluoride, polytetrafluoroethylene, fluorinated polyvinylidene fluoride, and polytetrafluoroethylene ethylene copolymer; a polymer composition having ion conductivity of alkali metal ions (especially, lithium ion); and so on. The negative electrode binder may be used alone or in any combination.

In some embodiments, based on the weight of the negative electrode active substance layer, the content of the negative electrode binder is greater than 0.1%, greater than 0.5%, or greater than 0.6%. In some embodiments, based on the weight of the negative electrode active substance layer, the content of the negative electrode binder is less than 10%, less than 8%, less than 5%, or less than 4%. In some embodiments, the content of the negative electrode binder is within a range between any two of the foregoing values. When the content of the negative electrode binder falls within the foregoing range, the capacity of the electrochemical apparatus and the strength of the negative electrode can be fully ensured.

In a case in which the negative electrode active substance layer contains a rubber-like polymer (for example, SBR), in some embodiments, based on the weight of the negative electrode active substance layer, the content of the negative electrode binder is greater than 0.1%, greater than 0.5%, or greater than 0.6%. In some embodiments, based on the weight of the negative electrode active substance layer, the content of the negative electrode binder is less than 5%, less than 3%, or less than 2%. In some embodiments, based on the weight of the negative electrode active substance layer, the content of the negative electrode binder is within a range between any two of the foregoing values.

In a case in which the negative electrode active substance layer contains a fluorine polymer (for example, polyvinylidene fluoride), in some embodiments, based on the weight of the negative electrode active substance layer, the content of the negative electrode binder is greater than 1%, greater than 2%, or greater than 3%. In some embodiments, based on the weight of the negative electrode active substance layer, the content of the negative electrode binder is less than 10%, less than 8%, or less than 5%. Based on the weight of the negative electrode active substance layer, the content of the negative electrode binder is within a range between any two of the foregoing values.

Thickener

The thickener is usually used to adjust viscosity of the negative electrode slurry. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein, salt thereof, and the like. The thickener may be used alone or in any combination.

In some embodiments, based on the weight of the negative electrode active substance layer, the content of the thickener is greater than 0.1%, greater than 0.5%, or greater than 0.6%. In some embodiments, based on the weight of the negative electrode active substance layer, the content of the thickener is less than 5%, less than 3%, or less than 2%. When the content of the thickener falls within the foregoing range, a decrease in the capacity of the electrochemical apparatus and an increase in the resistance can be suppressed, and good coating of the negative electrode slurry can be ensured.

Solvent

The type of the solvent used for forming the negative electrode slurry is not particularly limited provided that the solvent is capable of dissolving or dispersing the negative electrode active substance, the negative electrode binder, and the thickener and the conductive material that are used as necessary. In some embodiments, the solvent used for forming the negative electrode slurry may be any one of an aqueous solvent and an organic solvent. Examples of the aqueous solvent may include, but are not limited to, water, alcohol, and the like. Examples of the organic solvent may include, but are not limited to, N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, hexamethylphosphoramide, dimethyl sulfoxide, benzene, xylene, quinoline, pyridine, methylnaphthalene, hexane, and so on. The solvents may be used alone or in any combination.

Preparation of the Negative Electrode

The negative electrode in the electrochemical apparatus of this application may be prepared by using any known method. For example, a binder, a solvent, a thickener to be added as necessary, a conductive material, a filler, and the like are added to the negative electrode active substance to prepare a slurry, and the slurry is applied onto the negative electrode current collector. After drying and pressing, the electrode is obtained. The negative electrode active substance may be rolled to form a sheet electrode or compressed to form a particle electrode.

II. Electrolyte

The electrolyte used in the electrochemical apparatus of this application includes an electrolyte substance and a solvent for dissolving the electrolyte substance. In some embodiments, the electrolyte used in the electrochemical apparatus of this application further includes an additive.

According to some embodiments of this application, the electrolyte further includes at least one of the following compounds:

i. propionate;

ii. a compound having cyano group iii. lithium difluorophosphate; or iv. a compound of Formula 1:

Formula 1

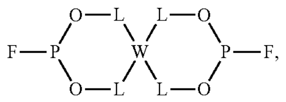

where:

W is

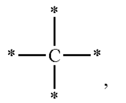

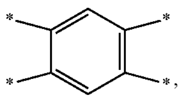

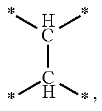

or

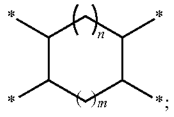

each L is independently a single bond or methylene;

m is 1, 2, 3, or 4; and n is 0, 1, or 2.

(i) Propionate

In some embodiments, the propionate includes a compound of Formula 2:

Formula 2

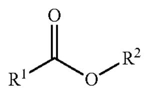

where:

$R^1$ is selected from ethyl or haloethyl, and $R^2$ is selected from $C_1$-$C_6$ alkyl or $C_1$-$C_6$ haloalkyl.

In some embodiments, the propionate includes, but is not limited to, methyl propionate, ethyl propionate, propyl propionate, butyl propionate, amyl propionate, methyl halopropionate, ethyl halopropionate, propyl halopropionate, butyl halopropionate, and amyl halopropionate. In some embodiments, the propionate is selected from at least one of methyl propionate, ethyl propionate, propyl propionate, butyl propionate, and pentyl propionate. In some embodiments, the halogen groups in the methyl halopropionate, ethyl halopropionate, propyl halopropionate, butyl halopropionate, and amyl halopropionate are selected from one or more of a fluorine group (—F), a chlorine group (—Cl), a bromine group (—Br), and an iodine group (—I). In some embodiments, the halogen group is a fluorine group (—F) that can achieve a better effect.

In some embodiments, based on the weight of the electrolyte, the content of propionate is 10% to 60%. In some embodiments, based on the weight of the electrolyte, the content of propionate is 20% to 50%. In some embodiments, based on the weight of the electrolyte, the content of propionate is 30% to 40%. In some embodiments, based on the weight of the electrolyte, the content of the propionate is 10%, 15%, 20%, 25%, 30%, 35%, 40%, 45%, 50%, 55%, 60%, or within a range between any two of the foregoing values.

(ii) Compound Having Cyano Group

In some embodiments, the compound having cyano group includes, but is not limited to, one or more of the following: succinonitrile, glutaronitrile, adiponitrile, 1,5-dicyanopentane, 1,6-dicyanohexane, tetramethylsuccinonitrile, 2-methylglutaronitrile, 2,4-dimethylglutaronitrile, 2,2,4,4-tetramethylglutaronitrile, 1,4-dicyanopentane, 1,2-dicyanobenzene, 1,3-dicyanobenzene, 1,4-dicyanobenzene, ethylene glycol bis(propionitrile) ether, 3,5-dioxa-heptanedionitrile, 1,4-bis(cyanoethoxy) butane, diethylene glycol di(2-cyanoethyl) ether, triethylene glycol di(2-cyanoethyl) ether, tetraethylene glycol di(2-cyanoethyl) ether, 1,3-di(2-cyanoethoxy) propane, 1,4-di(2-cyanoethoxy) butane, 1,5-di(2-cyanoethoxy) pentane, ethylene glycol di(4-cyanobutyl) ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, 1,3,5-pentamethylenetricarbonitrile, 1,2,3-propanetricarbonitrile, 1,3,6-hexanetricarbonitrile, 1,2,6-hexanetricarbonitrile, 1,2,3-tris(2-cyanoethoxy) propane, 1,2,4-tris(2-cyanoethoxy) butane, 1,1,1-tris(cyanoethoxymethylene) ethane, 1,1,1-tris(cyanoethoxymethylene) propane, 3-methyl-1,3,5-tris(cyanoethoxy) pentane, 1,2,7-tris (cyanoethoxy) heptane, 1,2,6-tris(cyanoethoxy) hexane, or 1,2,5-tris(cyanoethoxy) pentane.

The compound having cyano group may be used alone or in any combination. If the electrolyte contains two or more compounds having cyano groups, the content of the compounds having cyano groups is the total content percentage of the two or more compounds having cyano groups.

In some embodiments, based on the weight of the electrolyte, the content of the compound having cyano group is b % and b is within a range of 0.01 to 10. In some embodiments, b is within a range of 0.1 to 8. In some embodiments, b is within a range of 0.5 to 5. In some embodiments, b is within a range of 1 to 3. In some embodiments, b is 0.01, 0.05, 0.1, 0.5, 0.8, 1, 1.5, 2, 2.5, 3, 3.5, 4, 4.5, 5, 5.5, 6, 6.5, 7, 7.5, 8, 8.5, 9, 9.5, 10, or within a range between any two of the foregoing values. When the content of the compound having cyano group in the electrolyte falls within the foregoing range, the high-temperature storage swelling performance and the cycle swelling performance of the electrochemical apparatus can be further improved.

In some embodiments, the content b % of the compound having cyano group in the electrolyte and the content a % of the first metal in the negative electrode current collector satisfy: $1 \leq b/a \leq 300$. In some embodiments, $5 \leq b/a \leq 250$. In some embodiments, $10 \leq b/a \leq 200$. In some embodiments, $50 \leq b/a \leq 150$. In some embodiments, $80 \leq b/a \leq 100$. In some embodiments, b/a is 1, 5, 10, 20, 50, 80, 100, 120, 150, 180, 200, 220, 250, 280, 300, or within a range between any two of the foregoing values. When the content b % of the compound having cyano group in the electrolyte and the content a % of the first metal in the negative electrode current collector satisfy the foregoing relationship, the high-temperature storage swelling performance and the cycle swelling performance of the electrochemical apparatus can be further improved.

In some embodiments, the content b % of the compound having cyano group in the electrolyte and the weight per unit area W $mg/cm^2$ of the negative electrode active substance layer satisfy: $0.5 \leq W/b \leq 24$. In some embodiments, $1 \leq W/b \leq 20$. In some embodiments, $5 \leq W/b \leq 15$. In some embodiments, $8 \leq W/b \leq 10$. In some embodiments, W/b is 0.5, 1, 2, 5, 8, 10, 12, 15, 18, 20, 22, 24, or within a range between any two of the foregoing values. When the content b % of the compound having cyano group in the electrolyte and the weight per unit area W $mg/cm^2$ of the negative electrode active substance layer satisfy the foregoing relationship, the high-temperature storage swelling performance and the cycle swelling performance of the electrochemical apparatus can be further improved.

(iii) Lithium Difluorophosphate ($LiPO_2F_2$)

In some embodiments, based on the weight of the electrolyte, the content of lithium difluorophosphate is 0.01% to 1.5%. In some embodiments, based on the weight of the electrolyte, the content of lithium difluorophosphate is 0.05% to 1.2%. In some embodiments, based on the weight of the electrolyte, the content of lithium difluorophosphate is 0.1% to 1.0%. In some embodiments, based on the weight of the electrolyte, the content of lithium difluorophosphate is 0.5% to 0.8%. In some embodiments, based on the weight of the electrolyte, the content of the lithium difluorophosphate is 0.01%, 0.05%, 0.1%, 0.15%, 0.2%, 0.25%, 0.3%, 0.35%, 0.4%, 0.45%, 0.5%, 0.8%, 1%, 1.5%, or within a range between any two of the foregoing values.

(iv) Compound of Formula 1

In some embodiments, the compound of Formula 1 includes at least one of the following compounds:

Formula 1-1

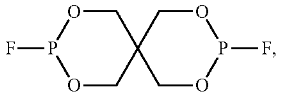

or

Formula 1-2

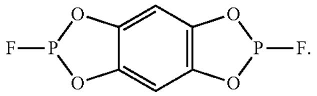

In some embodiments, based on the weight of the electrolyte, the content of the compound of Formula 1 is within a range of 0.01% to 5%. In some embodiments, based on the weight of the electrolyte, the content of the compound of Formula 1 is within a range of 0.05% to 3%. In some embodiments, based on the weight of the electrolyte, the content of the compound of Formula 1 is within a range of 0.1% to 2%. In some embodiments, based on the weight of the electrolyte, the content of the compound of Formula 1 is within a range of 0.5% to 1%. In some embodiments, based on the weight of the electrolyte, the content of the compound of Formula 1 is 0.01%, 0.05%, 0.1%, 0.5%, 1%, 2%, 3%, 4%, 5%, or within a range between any two of the foregoing values.

Solvent

In some embodiments, the electrolyte further includes any non-aqueous solvent that is known in the art and that may be used as a solvent for the electrolyte.

In some embodiments, the non-aqueous solvent includes, but is not limited to, one or more of the following: cyclic carbonate, linear carbonate, cyclic carboxylic acid ester, linear carboxylic acid ester, cyclic ether, linear ether, a phosphorus-containing organic solvent, a sulfur-containing organic solvent, and an aromatic fluorine-containing solvent.

In some embodiments, examples of the cyclic carbonate may include, but are not limited to, one or more of the following: ethylene carbonate (EC), propylene carbonate (PC), and butylene carbonate. In some embodiments, the cyclic carbonate has 3 to 6 carbon atoms.

In some embodiments, examples of the linear carbonate may include, but are not limited to, one or more of the following: dimethyl carbonate, ethyl methyl carbonate, diethyl carbonate (DEC), methyl n-propyl carbonate, ethyl n-propyl carbonate, dipropyl carbonate, and the like. Examples of the linear carbonate substituted with fluorine may include, but are not limited to, one or more of the following: bis(fluoromethyl) carbonate, bis(difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, 2,2,2-trifluoroethyl methyl carbonate, and the like.

In some embodiments, examples of the cyclic carboxylic acid ester may include, but are not limited to, one or more of the following: γ-butyrolactone and γ-valerolactone. In some embodiments, some hydrogen atoms of the cyclic carboxylic acid ester may be substituted with fluorine.

In some embodiments, examples of the linear carboxylic acid esters may include, but are not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, some hydrogen atoms of the linear carboxylic acid ester may be substituted with fluorine. In some embodiments, examples of the fluorine-substituted linear carboxylic acid ester may include, but are not limited to, methyl trifluoroacetate, ethyl trifluoroacetate, propyl trifluoroacetate, butyl trifluoroacetate, 2,2,2-trifluoroethyl trifluoroacetate, and the like.

In some embodiments, examples of the cyclic ether may include, but are not limited to, one or more of the following: tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, and dimethoxypropane.

In some embodiments, examples of the linear ether may include, but are not limited to, one or more of the following: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, examples of the phosphorus-containing organic solvent may include, but are not limited to, one or more of the following: trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, and tris(2,2,3,3,3-pentafluoropropyl) phosphate, and the like.

In some embodiments, examples of the sulfur-containing organic solvent may include, but are not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, a portion of hydrogen atoms of the sulfur-containing organic solvent may be substituted with fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene, and trifluoromethylbenzene.

In some embodiments, solvents used in the electrolyte of this application include cyclic carbonate, linear carbonate, cyclic carboxylic acid ester, linear carboxylic acid ester, and a combination thereof. In some embodiments, the solvent used in the electrolyte of this application includes an organic solvent selected from a group consisting of the following substances: ethylene carbonate, propylene carbonate, diethyl carbonate, ethyl propionate, propyl propionate, n-propyl acetate, ethyl acetate, and a combination thereof. In some embodiments, the solvent used in the electrolyte of this application includes ethylene carbonate, propylene carbonate, diethyl carbonate, ethyl propionate, propyl propionate, γ-butyrolactone, and a combination thereof.

Additive

In some embodiments, examples of the additive may include, but are not limited to, one or more of the following: fluorocarbonate, carbon-carbon double bond-containing vinyl carbonate, sulfur-oxygen double bond-containing compound, and anhydride.

In some embodiments, based on the weight of the electrolyte, a content of the additive is 0.01% to 15%, 0.1% to 10%, or 1% to 5%.

According to an embodiment of this application, based on the weight of the electrolyte, the content of the propionate is 1.5 to 30 times, 1.5 to 20 times, 2 to 20 times, or 5 to 20 times of the additive.

In some embodiments, the additive includes one or more fluorocarbonates. During charging/discharging of the lithium-ion battery, the fluorocarbonate may act with the propionate to form a stable protective film on the surface of the negative electrode, so as to suppress decomposition reaction of the electrolyte.

In some embodiments, the fluoroethylene carbonate has a formula $C{=}O(OR_x)(OR_y)$, where $R_x$ and $R_y$ each are selected from an alkyl group or haloalkyl group having 1 to 6 carbon atoms. At least one of $R_x$ and $R_y$ is selected from a fluoroalkyl group having 1 to 6 carbon atoms. $R_x$ and $R_y$, optionally together with the atoms to which they are attached, form a 5- to 7-membered ring.

In some embodiments, examples of the fluoroethylene carbonate may include, but are not limited to, one or more of the following: fluoroethylene carbonate, cis-4,4-difluoroethylene carbonate, trans-4,4-difluoroethylene carbonate, 4,5-difluoroethylene carbonate, 4-fluoro-4-methyl ethylene carbonate, 4-fluoro-5-methyl ethylene carbonate, and the like.

In some embodiments, the additive includes one or more carbon-carbon double bond-containing vinyl carbonates. Examples of the carbon-carbon double bond-containing vinyl carbonate may include, but are not limited to, one or more of the following: vinylidene carbonate, methylvinylidene carbonate, ethylvinylidene carbonate, 1,2-dimethylvinylidene carbonate, 1,2-diethylvinylidene carbonate, fluorovinylidene carbonate, trifluoromethylvinylidene carbonate; vinylethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate, 1,1-diethyl-2-methylene ethylene carbonate, and the like. In some embodiments, the carbon-carbon double bond containing vinyl carbonate includes vinylidene carbonate, and can easily achieve better effects.

In some embodiments, the additive is a combination of fluorocarbonate and carbon-carbon double bond containing vinyl carbonate. In some embodiments, the additive is a combination of fluorocarbonate and the sulfur-oxygen double bond-containing compound. In some embodiments, the additive is a combination of fluorocarbonate and a compound having 2 to 4 cyano groups. In some embodiments, the additive is a combination of fluorocarbonate and cyclic carboxylic acid ester. In some embodiments, the additive is a combination of fluorocarbonate and cyclic phosphoric anhydride. In some embodiments, the additive is a combination of fluorocarbonate and carboxylic anhydride. In some embodiments, the additive is a combination of fluorocarbonate and sulfonic anhydride. In some embodiments, the additive is a combination of fluorocarbonate and carboxylic sulfonic mixed anhydride.

Electrolyte Substance

The electrolyte substance is not particularly limited, and may use any substance known as the electrolyte substance. For lithium secondary batteries, lithium salts are usually used. Examples of the electrolyte substance may include, but are not limited to, inorganic lithium salts such as $LiPF_6$, $LiBF_4$, $LiClO_4$, $LiAlF_4$, $LiSbF_6$, and $LiWF_7$; lithium tungstates such as $LiWOF_5$; lithium carboxylate salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$; lithium sulfonate salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$; lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic 1,2-perfluoroethane bissulfonimide lithium, cyclic 1,3-perfluoropropane bissulfonimide lithium, and $LiN(CF_3SO_2)(C_4F_9SO_2)$; lithium methylate salts such as $LiC(FSO_2)_3$, $LiC(CF_3SO_2)_3$, and $LiC(C_2F_5SO_2)_3$; (malonate) lithium borate salts such as bis(malonate) lithium borate salt and difluoro(malonate) lithium borate salt; (malonate) lithium phosphate salts such as tris(malonate) lithium phosphate, difluorobis(malonate) lithium phosphate, and tetrafluoro (malonate) lithium phosphate; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$; lithium oxalate borate salts such as lithium difluorooxalate borate and lithium bis(oxalate) borate; lithium oxalate phosphate salts such as lithium tetrafluorooxalatophosphate, lithium difluorobis(oxalato) phosphate, and lithium tris(oxalato)phosphate; and so on.

In some embodiments, the electrolyte substance is selected from the group consisting of $LiPF_6$, $LiSbF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2FSSO_2)_2$, cyclic 1,2-perfluoroethanedisulfonimide lithium, cyclic 1,3-perfluoropropanedisulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluorooxalate borate, lithium bis(oxalate) borate, or lithium difluorobis(oxalato)phosphate. The electrolyte helps improve the output power performance, the high-rate charge/discharge performance, the high temperature storage performance, the cycle performance, and the like of the electrochemical apparatus.

The content of the electrolyte substance is not particularly limited provided that the effect of this application is not affected. In some embodiments, the total molar concentration of lithium in the electrolyte is greater than 0.3 mol/L, greater than 0.4 mol/L, or greater than 0.5 mol/L. In some embodiments, the total molar concentration of lithium in the electrolyte is less than 3 mol/L, less than 2.5 mol/L, or less than 2.0 mol/L. In some embodiments, the total molar concentration of lithium in the electrolyte is within a range between any two of the foregoing values. When the concentration in the electrolyte substance falls within the foregoing range, the amount of lithium as charged particles is not excessively small, and the viscosity can be controlled within an appropriate range, so as to ensure good conductivity.

When two or more electrolyte substances are used, the electrolyte substance includes at least one salt selected from a group consisting of monofluorophosphate, borate, oxalate, and fluorosulfonate. In some embodiments, the electrolyte substance includes a salt selected from a group consisting of monofluorophosphate, oxalate, and fluorosulfonate. In some embodiments, the electrolyte substance includes a lithium salt. In some embodiments, based on the weight of the electrolyte substance, the content of the salt selected from the group consisting of monofluorophosphate, borate, oxalate, and fluorosulfonate is greater than 0.01% or greater than 0.1%. In some embodiments, based on the weight of the electrolyte substance, the content of the salt selected from the group consisting of monofluorophosphate, borate, oxalate, and fluorosulfonate is less than 20% or less than 10%. In some embodiments, the content of the salt selected from the group consisting of monofluorophosphate, borate, oxalate, and fluorosulfonate is within a range between any two of the foregoing values.

In some embodiments, the electrolyte substance includes more than one substance selected from the group consisting of monofluorophosphate, borate, oxalate, and fluorosulfonate and more than one other salt different from the more than one substance. Examples of the other salt include lithium salts exemplified greater than, and in some embodiments, are $LiPF_6$, $LiN(FSO_2)(CF_3SO_2)$, $LiN(CF_3SO_2)_2$, $LiN(C_2F_5SO_2)_2$, lithium cyclic 1,2-perfluoroethane disulfonimide, lithium cyclic 1,3-perfluoropropane disulfonimide, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, and $LiPF_3(C_2F_5)_3$. In some embodiments, the other salt is $LiPF_6$.

In some embodiments, based on the weight of the electrolyte substance, the content of the other salt is greater than 0.01% or greater than 0.1%. In some embodiments, based on the weight of the electrolyte substance, the content of the other salt is less than 20%, less than 15%, or less than 10%. In some embodiments, the content of the other salt is within a range between any two of the foregoing values. The other salt having the foregoing content helps balance the conductivity and viscosity of the electrolyte.

In the electrolyte, in addition to the foregoing solvent, additive, and electrolyte salt, additional additives such as a negative electrode film forming agent, a positive electrode protection agent, and an overcharge prevention agent may be included as necessary. For the additive, an additive generally used in non-aqueous electrolyte secondary batteries may be used, and examples thereof may include, but are not limited to, vinylidene carbonate, succinic anhydride, biphenyls, cyclohexylbenzene, 2,4-difluoroanisole, propane sulfonate, propylene sulfonate, and the like. The additives may be used alone or in any combination. In addition, the content of these additives in the electrolyte is not particularly limited and may be properly set according to the types of the additives or the like. In some embodiments, based on the weight of the electrolyte, the content of the additive is less than 5%, within a range of 0.01% to 5%, or within a range of 0.2% to 5%.

III. Positive Electrode

The positive electrode includes a positive electrode current collector and a positive electrode active substance layer disposed on one or both surfaces of the positive electrode current collector.

1. Positive Electrode Active Substance Layer

The positive electrode active substance layer includes a positive electrode active substance. The positive electrode active substance layer may be one or more layers. Each layer of the multilayer positive electrode active substances may contain the same or different positive electrode active substances. The positive electrode active substance is any material capable of reversibly intercalating and deintercalating metal ions such as lithium ions.

The type of the positive electrode active substance is not particularly limited provided that metal ions (for example, lithium ions) can be electrochemically absorbed and released. In some embodiments, the positive electrode active substance is a material that contains lithium and at least one transition metal. Examples of the positive electrode active substance may include, but are not limited to, lithium transition metal composite oxides and lithium-containing transition metal phosphate compounds.

In some embodiments, transition metals in the lithium transition metal composite oxide include V, Ti, Cr, Mn, Fe, Co, Ni, Cu, and the like. In some embodiments, the lithium transition metal composite oxides include lithium cobalt composite oxides such as $LiCoO_2$, lithium nickel composite oxides such as $LiNiO_2$, lithium manganese composite oxides such as $LiMnO_2$, $LiMn_2O_4$, and $Li_2MnO_4$, and lithium nickel manganese cobalt composite oxides such as $LiNi_{1/3}Mn_{1/3}Co_{1/3}O_2$, and $LiNi_{0.5}Mn_{0.3}Co_{0.2}O_2$, where a portion of transition metal atoms serving as a main body of these lithium transition metal composite oxides is substituted with other elements such as Na, K, B, F, Al, Ti, V, Cr, Mn, Fe, Co, Li, Ni, Cu, Zn, Mg, Ga, Zr, Si, Nb, Mo, Sn, and W. Examples of the lithium transition metal composite oxide may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, and $LiMn_{1.5}Ni_{0.5}O_4$. Examples of a combination of lithium transition metal composite oxides include, but are not limited to, a combination of $LiCoO_2$ and $LiMn_2O_4$, where a portion of Mn in $LiMn_2O_4$ may be substituted with a transition metal (for example, $LiNi_{0.33}Co_{0.33}Mn_{0.33}O_2$) and a portion of Co in $LiCoO_2$ may be substituted with a transition metal.

In some embodiments, transition metals in the lithium-containing transition metal phosphate compound include V, Ti, Cr, Mn, Fe, Co, Ni, Cu, and the like. In some embodiments, the lithium-containing transition metal phosphate compound includes iron phosphates such as $LiFePO_4$, $Li_3Fe_2(PO_4)_3$, and $LiFeP_2O_7$, and cobalt phosphates such as $LiCoPO_4$, where a portion of transition metal atoms serving as a main body of these lithium transition metal phosphate compounds are substituted with other elements such as Al, Ti, V, Cr, Mn, Fe, Co, Li, Ni, Cu, Zn, Mg, Ga, Zr, Nb, and Si.

In some embodiments, the positive electrode active substance includes lithium phosphate, which can improve the continuous charging property of the electrochemical apparatus. The use of lithium phosphates is not limited. In some embodiments, the positive electrode active substance and lithium phosphates are used in combination. In some embodiments, the content of the lithium phosphate is greater than 0.1%, greater than 0.3%, or greater than 0.5% relative to the weight of the positive electrode active substance and lithium phosphate. In some embodiments, the content of the lithium phosphate is less than 10%, less than 8%, or less than 5% relative to the weight of the positive electrode active substance and lithium phosphate. In some embodiments, the content of the lithium phosphate is within a range between any two of the foregoing values.

Surface Coating

A substance different from a composition of the positive electrode active substance may be adhered onto the surface of the positive electrode active substance. Examples of the surface adhesion substance include, but are not limited to, oxides such as aluminum oxide, silicon dioxide, titanium dioxide, zirconium oxide, magnesium oxide, calcium oxide, boron oxide, antimony oxide, and bismuth oxide; sulphates such as lithium sulfate, sodium sulfate, potassium sulfate, magnesium sulfate, calcium sulfate, and aluminum sulfate; carbonates such as lithium carbonate, calcium carbonate, and magnesium carbonate; carbon; and so on.

These surface adhesion substances may be adhered to the surface of the positive electrode active substance by using the following methods: a method of dissolving or suspending the surface adhesion substance in the solvent to infiltrate into the positive electrode active substance and then performing drying; a method of dissolving or suspending a surface adhesion substance precursor in the solvent to infiltrate into the positive electrode active substance and then performing heating or the like to implement reaction of the surface adhesion substance; and a method of adding the surface adhesion substance to a positive electrode active substance precursor and performing sintering simultaneously. In a case of carbon adhesion, a method for mechanical adhesion of a carbon material (for example, activated carbon) may also be used.

In some embodiments, based on the weight of the positive electrode active substance layer, the content of the surface adhesion substance is greater than 0.1 ppm, greater than 1 ppm, or greater than 10 ppm. In some embodiments, based on the weight of the positive electrode active substance layer, the content of the surface adhesion substance is less than 20%, or less than 10%. In some embodiments, based on the weight of the positive electrode active substance layer, the content of the surface adhesion substance is within a range between any two of the foregoing values.

Adhering a substance to the surface of the positive electrode active substance can suppress oxidation reaction of the electrolyte on the surface of the positive electrode active substance and improve the service life of the electrochemical apparatus. An excessively small amount of substance adhered to the surface cannot make the effect fully displayed while an excessively large amount of substance adhered to the surface prevents intercalation and deintercalation of lithium ions to increase the resistance sometimes.

In this application, another substance that has a composition different from the positive electrode active substance and that is adhered to the surface of the positive electrode active substance is also called "positive electrode active substance".

Shape

In some embodiments, the shapes of particles of the positive electrode active substance include, but are not limited to, block, polyhedron, spherical, ellipsoidal, plate, needle, column, and the like. In some embodiments, the positive electrode active substance particles include primary particles, secondary particles, or a combination thereof. In some embodiments, the primary particles may agglomerate to form the secondary particles.

Tap Density

In some embodiments, the tap density of the positive electrode active substance is greater than 0.5 g/$cm^3$, greater than 0.8 g/$cm^3$, or greater than 1.0 g/$cm^3$. When the tap density of the positive electrode active substance falls within the foregoing range, the amount of the dispersion medium, the amount of the conductive material, and the amount of the positive electrode binder that are required for forming the positive electrode active substance layer can be suppressed, thereby ensuring a filling rate of the positive electrode active substance and the capacity of the electrochemical apparatus. Using a composite oxide powder with a high tap density can form a positive electrode active substance layer with a high density. Generally, a larger tap density indicates being more preferable, and there is no particular upper limit. In some embodiments, the tap density of the positive electrode active substance is less than 4.0 g/$cm^3$, less than 3.7 g/$cm^3$, or less than 3.5 g/$cm^3$. When the tap density of the positive electrode active substance has the upper limit as described above, an decrease in load characteristics can be suppressed.

The tap density of the positive electrode active substance can be calculated in the following manner: placing 5 g to 10 g of the positive electrode active substance powder into a 10 mL glass measuring cylinder and tapping 200 times at 20 mm stroke to obtain a powder filling density (the tap density).

Median Particle Size (D50)

When the positive electrode active substance particles are primary particles, the median particle size (D50) of the positive electrode active substance particles is a primary particle size of the positive electrode active substance particles. When the primary particles of the positive electrode active substance particles agglomerate to form secondary particles, the median particle size (D50) of the positive electrode active substance particles is a secondary particle size of the positive electrode active substance particles.

In some embodiments, the median particle size (D50) of the positive electrode active substance particles is greater than 0.3 μm, greater than 0.5 μm, greater than 0.8 μm, or greater than 1.0 μm. In some embodiments, the median particle size (D50) of the positive electrode active substance particles is less than 30 μm, less than 27 μm, less than 25 μm, or less than 22 μm. In some embodiments, the median particle size (D50) of the positive electrode active substance particles is within a range between any two of the foregoing values. When the median particle size (D50) of the positive electrode active substance particles falls within the foregoing range, a positive electrode active substance with a high tap density can be implemented, and performance degradation of the electrochemical apparatus can be suppressed. On the other hand, problems such as stripes can be prevented during preparation of the positive electrode of the electrochemical apparatus (that is, when the positive electrode active substance, the conductive material, the binder, and the like are made into a slurry with a solvent and the slurry is applied in a thin-film form). Herein, more than two types of positive electrode active substances having different median particle sizes are mixed, to further improve the filling property during preparation of the positive electrode.

The median particle size (D50) of the positive electrode active substance particles can be measured by using a laser diffraction/scattering particle size distribution tester: when LA-920 manufactured by HORIBA is used as a particle size distribution tester, using a 0.1% sodium hexametaphosphate aqueous solution as a dispersion medium for testing, and measuring a result at an refractive index of 1.24 after ultrasonic dispersion for five minutes.

Average Primary Particle Size

When the primary particles of the positive electrode active substance particles agglomerate to form the secondary particles, in some embodiments, the average primary particle size of the positive electrode active substance is greater than 0.05 μm, greater than 0.1 μm, or greater than 0.5 μm. In some embodiments, the average primary particle size of the positive electrode active substance is less than 5 μm, less than 4 μm, less than 3 μm, or less than 2 μm. In some embodiments, the average primary particle size of the positive electrode active substance is within a range between any two of the foregoing values. When the average primary particle size of the positive electrode active substance falls within the foregoing range, the powder filling property and the specific surface area can be ensured, performance degradation of the battery can be suppressed, and moderate crystallinity can be implemented, thereby ensuring reversibility of charging and discharging of the electrochemical apparatus.

The average primary particle size of the positive electrode active substance may be obtained by observing an image from a scanning electron microscope (SEM): in the SEM image magnified 10000 times, for any 50 primary particles, obtaining longest values of slices obtained on the left and right boundary lines of the primary particles relative to the horizontal straight line, and calculating an average value to obtain the average primary particle size.

Specific Surface Area (BET)

In some embodiments, the specific surface area (BET) of the positive electrode active substance is greater than 0.1 $m^2/g$, greater than 0.2 $m^2/g$, or greater than 0.3 $m^2/g$. In some embodiments, the specific surface area (BET) of the positive electrode active substance is less than 50 $m^2/g$, less than 40 $m^2/g$, or less than 30 $m^2/g$. In some embodiments, the specific surface area (BET) of the positive electrode active substance is within a range between any two of the foregoing values. When the specific surface area (BET) of the positive electrode active substance falls within the foregoing range, the performance of the electrochemical apparatus can be ensured, and the positive electrode active substance can have a good coating property.

The specific surface area (BET) of the positive electrode active substance can be measured by using the following method: using a surface area meter (for example, a full-automatic surface area tester manufactured by OHKURA or RIKEN) to perform pre-drying on the sample at 150° C. for 30 minutes when nitrogen flows, using nitrogen-helium mixed gas whose relative pressure value of nitrogen is accurately adjusted to 0.3 with respect to atmospheric pressure, and conducting tests by using the nitrogen adsorption BET single-point method based on the air flow method.

Positive Electrode Conductive Material

The type of positive electrode conductive material is not limited, and any known conductive material may be used. Examples of the positive electrode conductive material may include, but are not limited to, graphite such as natural graphite and artificial graphite; carbon black such as acetylene black; carbon materials including amorphous carbon such as acicular coke; carbon nanotube; graphene; and the like. The positive electrode conductive material may be used alone or in any combination.

In some embodiments, based on the weight of the positive electrode active substance layer, the content of the positive electrode conductive material is greater than 0.01%, greater than 0.1%, or greater than 1%. In some embodiments, based on the weight of the positive electrode active substance layer, the content of the positive electrode conductive material is less than 10%, less than 8%, or less than 5%. When the content of the positive electrode conductive material falls within the foregoing range, sufficient conductivity and the capacity of the electrochemical apparatus can be ensured.

Positive Electrode Binder

The type of the positive electrode binder used during preparation of the positive electrode active substance layer is not particularly limited, and in the case of using the coating method, any material that can be dissolved or dispersed in a liquid medium used in the preparation of the electrode is acceptable. Examples of the positive electrode binder may include, but are not limited to, one or more of the following: a resin-based polymer such as polyethylene, polypropylene, polyethylene glycol terephthalate, polymethyl methacrylate, polyimide, aromatic polyamide, cellulose, or nitrocellulose; a rubber polymer such as styrene-butadiene rubber (SBR), isoprene rubber, polybutadiene rubber, fluorine rubber, acrylonitrile butadiene rubber (NBR), or ethylene propylene rubber; styrene butadiene styrene block copolymer or hydride thereof, a thermoplastic elastomeric polymer such as ethylene propylene diene terpolymer (EPDM), styrene ethylene butadiene styrene copolymer, styrene isoprene styrene block copolymer or hydride thereof, a soft resinous polymer such as syndiotactic-1,2-polybutadiene, polyvinyl acetate, ethylene vinyl acetate copolymer, propylene α-olefin copolymer; a fluorine polymer such as polyvinylidene fluoride (PVDF), polytetrafluoroethylene, fluorinated polyvinylidene fluoride, polytetrafluoroethylene ethylene copolymer; a polymer composition having ion conductivity of alkali metal ions (especially, lithium ion); and so on. The positive electrode binder may be used alone or in any combination.

In some embodiments, based on the weight of the positive electrode active substance layer, the content of the positive electrode binder is greater than 0.1%, greater than 1%, or greater than 1.5%. In some embodiments, based on the weight of the positive electrode active substance layer, the content of the positive electrode binder is less than 10%, less than 8%, less than 5%, or less than 4%. When the content of the positive electrode binder falls within the foregoing range, the positive electrode can have good conductivity and sufficient mechanical strength, and the capacity of the electrochemical apparatus can be ensured.

Solvent

The type of the solvent used for forming the positive electrode slurry is not limited provided that the solvent is capable of dissolving or dispersing the positive electrode active substance, the conductive material, the positive electrode binder, and the thickener used as required. Examples of the solvent used to form the positive electrode slurry may include any of an aqueous solvent and an organic solvent. Examples of the aqueous medium may include, but are not limited to, water, a mixed medium of alcohol and water, and the like. Examples of the organic medium may include, but are not limited to, aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine, and N,N-dimethylaminopropylamine; ethers such as diethyl ether, propylene oxide, and tetrahydrofuran (THF); amides such as N-methylpyrrolidone (NMP), dimethylformamide, and dimethylacetamide; aprotic polar solvents such as hexamethylphosphoramide and dimethyl sulfoxide; and so on.

Thickener

The thickener is usually used to adjust viscosity of the slurry. In the case of aqueous media, the thickener and styrene-butadiene rubber (SBR) emulsion may be used for making the slurry. The type of the thickener is not particularly limited, and examples of the thickener may include, but are not limited to, carboxymethyl cellulose, methyl cellulose, hydroxymethyl cellulose, ethyl cellulose, polyvinyl alcohol, oxidized starch, phosphorylated starch, casein, salt thereof, and the like. The thickener may be used alone or in any combination.

In some embodiments, based on the weight of the positive electrode active substance layer, the content of the thickener is greater than 0.1%, greater than 0.2%, or greater than 0.3%. In some embodiments, based on the weight of the positive electrode active substance layer, the content of the thickener is less than 5%, less than 3%, or less than 2%. In some embodiments, based on the weight of the positive electrode active substance layer, the content of the thickener is within a range between any two of the foregoing values. When the content of the thickener falls within the foregoing range, a good coating property of the positive electrode slurry can be ensured, and a decrease in the capacity of the electrochemical apparatus and an increase in the resistance can be suppressed.

Content Percentage of the Positive Electrode Active Substance

In some embodiments, based on the weight of the positive electrode active substance layer, the content of the positive electrode active substance is greater than 80%, greater than 82%, or greater than 84%. In some embodiments, based on the weight of the positive electrode active substance layer, the content of the positive electrode active substance is less than 99% or less than 98%. In some embodiments, based on the weight of the positive electrode active substance layer, the content of the positive electrode active substance is within a range between any two of the foregoing values. When the content of the positive electrode active substance falls within the foregoing range, the capacity of the positive electrode active substance in the positive electrode active substance layer can be ensured while the strength of the positive electrode can be maintained.

Density of the Positive Electrode Active Substance Layer

In order to increase the filling density of the positive electrode active substance, the positive electrode active substance layer obtained by coating and drying can be pressed by using a manual press, a roller, or the like. In some embodiments, the density of the positive electrode active substance layer is greater than 1.5 $g/cm^3$, greater than 2 $g/cm^3$, or greater than 2.2 $g/cm^3$. In some embodiments, the density of the positive electrode active substance layer is less than 5 $g/cm^3$, less than 4.5 $g/cm^3$, or less than 4 $g/cm^3$. In some embodiments, the density of the positive electrode active substance layer is within a range between any two of the foregoing values. When the density of the positive electrode active substance layer falls within the foregoing range, the electrochemical apparatus can have good charge/discharge performance and an increase in the resistance can be suppressed.

Thickness of the Positive Electrode Active Substance Layer

The thickness of the positive electrode active substance layer is the thickness of the positive electrode active substance layer on either side of the positive electrode current collector. In some embodiments, the thickness of the positive electrode active substance layer is greater than 10 μm or greater than 20 μm. In some embodiments, the thickness of the positive electrode active substance layer is less than 500 μm or less than 450 μm.

Manufacturing Method for the Positive Electrode Active Substance

The positive electrode active substance may be manufactured by using a commonly used method for manufacturing an inorganic compound. In order to prepare a spherical or ellipsoidal positive electrode active substance, the following preparation method may be used: dissolving or pulverizing and dispersing the raw material of transition metal in a solvent such as water; adjusting the pH while stirring; making and reclaiming spherical precursors; after drying as needed, adding Li sources such as LiOH, $Li_2CO_3$, and $LiNO_3$; and performing sintering at a high temperature, to obtain the positive electrode active substance.

2. Positive Electrode Current Collector

The type of positive electrode current collector is not particularly limited and may be any known material used as the positive electrode current collector. Examples of the positive electrode current collector may include, but are not limited to, metal materials such as aluminum, stainless steel, a nickel plating layer, titanium, and tantalum; and carbon materials such as a carbon cloth and carbon paper. In some embodiments, the positive electrode current collector is a metal material. In some embodiments, the positive electrode current collector is aluminum.

The form of the positive electrode current collector is not particularly limited. When the positive electrode current collector is a metal material, the positive electrode current collector may be in forms, including but not limited to a metal foil, a metal cylinder, a metal coil, a metal plate, a metal foil, a sheet metal mesh, a punched metal, a foamed metal, and the like. When the positive electrode current collector is a carbon material, the form of the positive electrode current collector may include, but is not limited to, a carbon plate, a carbon film, a carbon cylinder, and the like. In some embodiments, the positive electrode current collector is a metal foil. In some embodiments, the metal foil is a mesh. The thickness of the metal foil is not particularly limited. In some embodiments, the thickness of the metal foil is greater than 1 μm, greater than 3 μm, or greater than 5 μm. In some embodiments, the thickness of the metal foil is less than 1 mm, less than 100 μm, or less than 50 μm. In some embodiments, the thickness of the metal foil is within a range between any two of the foregoing values.

In order to reduce the electronic contact resistance of the positive electrode current collector and the positive electrode active substance layer, the surface of the positive electrode current collector may include an electrically-conductive additive. Examples of the electrically-conductive additive may include, but are not limited to, carbon and precious metals such as gold, platinum, and silver.

A thickness ratio of the positive electrode active substance layer to the positive electrode current collector is a thickness of one side of the positive electrode active substance layer divided by the thickness of the positive electrode current collector, and its value is not particularly limited. In some embodiments, the thickness ratio is less than 50, less than 30, or less than 20. In some embodiments, the thickness ratio is greater than 0.5, greater than 0.8, or greater than 1. In some embodiments, the thickness ratio is within a range between any two of the foregoing values. When the thickness ratio falls within the foregoing range, heat dissipation of the positive electrode current collector during charging and discharging at high current density can be suppressed, and the capacity of the electrochemical apparatus can be ensured.

3. Preparation of the Positive Electrode

The positive electrode may be prepared by forming, on a current collector, a positive electrode active substance layer containing a positive electrode active substance and a binder. The positive electrode using the positive electrode active substance can be prepared by using a conventional method: dry mixing the positive electrode active substance, the binder, and the conductive material and the thickener that are to be used as required to form a sheet, and pressing the resulting sheet onto the positive electrode current collector; or dissolving or dispersing these materials in a liquid medium to make a slurry, and applying the slurry onto the positive electrode current collector, followed by drying, to form a positive electrode active substance layer on the current collector. Then, the positive electrode is obtained.

IV. Separator

In order to prevent short circuits, a separator is usually provided between the positive electrode and the negative electrode. In this case, the electrolyte of this application usually permeates the separator.

The material and shape of the separator are not particularly limited provided that the separator does not significantly affect the effect of this application. The separator may be a resin, glass fiber, inorganic substance, or the like that is formed of a material stable to the electrolyte of this application. In some embodiments, the separator includes a porous sheet or nonwoven fabric-like material having an excellent fluid retention property, or the like. Examples of the material of the resin or glass fiber separator may include, but are not limited to, polyolefin, aromatic polyamide, polytetrafluoroethylene, polyethersulfone, and the like. In some embodiments, the polyolefin is polyethylene or polypropylene. In some embodiments, the polyolefin is polypropylene. The material of the separator may be used alone or in any combination.

The separator may alternatively be a material formed by laminating the foregoing materials, and examples thereof include, but are not limited to, a three-layer separator formed by laminating polypropylene, polyethylene, and polypropylene in order.

Examples of the material of the inorganic substance may include, but are not limited to, oxides such as aluminum oxide and silicon dioxide, nitrides such as aluminum nitride and silicon nitride, and sulfates (for example, barium sulfate and calcium sulfate). The form of the inorganic substance may include, but are not limited to, a granular or fibrous form.

The form of the separator may be a thin-film form, and examples thereof include, but are not limited to, a nonwoven fabric, a woven fabric, a microporous film, and the like. In the thin-film form, the separator has a pore diameter of 0.01 μm to 1 μm and a thickness of 5 μm to 50 μm. In addition to the independent thin-film-like separator, the following separator may alternatively be used: a separator that is obtained by using a resin-based binder to form a composite porous layer containing the inorganic particles on the surface of the positive electrode and/or the negative electrode, for example, a separator that is obtained by using fluororesin as a binder to form a porous layer on both surfaces of the positive electrode with alumina particles whose particle sizes of 90% particles are less than 1 μm.

The thickness of the separator is random. In some embodiments, the thickness of the separator is greater than 1 μm, greater than 5 μm, or greater than 8 μm. In some embodiments, the thickness of the separator is less than 50 μm, less than 40 μm, or less than 30 μm. In some embodiments, the thickness of the separator is within a range between any two of the foregoing values. When the thickness of the separator falls within the foregoing range, the insulation property and the mechanical strength can be ensured, and the rate performance and the energy density of the electrochemical apparatus can be ensured.

When a porous material such as a porous sheet or a nonwoven fabric is used as the separator, the porosity of the separator is random. In some embodiments, the porosity of the separator is greater than 10%, greater than 15%, or greater than 20%. In some embodiments, the porosity of the separator is less than 60%, less than 50%, or less than 45%. In some embodiments, the porosity of the separator is within a range between any two of the foregoing values. When the porosity of the separator falls within the foregoing range, the insulation property and the mechanical strength can be ensured and the film resistance can be suppressed, so that the electrochemical apparatus has good safety performance.

The average pore diameter of the separator is also random. In some embodiments, the average pore diameter of the separator is less than 0.5 μm or less than 0.2 μm. In some embodiments, the average pore diameter of the separator is greater than 0.05 μm. In some embodiments, the average pore diameter of the separator is within a range between any two of the foregoing values. If the average pore diameter of the separator exceeds the foregoing range, a short circuit is likely to occur. When the average pore diameter of the separator falls within the foregoing range, the electrochemical apparatus has good safety performance.

V. Components of the Electrochemical Apparatus

The components of the electrochemical apparatus include an electrode assembly, a collector structure, an outer packing case, and a protective element.

Electrode Assembly

The electrode assembly may be any one of a laminated structure in which the positive electrode and the negative electrode are laminated with the separator interposed therebetween, and a structure in which the positive electrode and the negative electrode are wound in a swirl shape with the separator interposed therebetween. In some embodiments, a mass percentage of the electrode assembly (occupancy of the electrode assembly) in the internal volume of the battery is greater than 40% or greater than 50%. In some embodiments, the occupancy of the electrode assembly is less than 90% or less than 80%. In some embodiments, the occupancy of the electrode assembly is within a range between any two of the foregoing values. When the occupancy of the electrode assembly falls within the foregoing range, the capacity of the electrochemical apparatus can be ensured, and a decrease in repeated charge/discharge performance and high temperature storage property caused by an increasing internal pressure can be suppressed.

Collector Structure

The collector structure is not particularly limited. In some embodiments, the collector structure is a structure that reduces the resistance of a wiring portion and a bonding portion. When the electrode assembly is the foregoing laminated structure, a structure in which metal core portions of the electrode layers are bundled and welded to terminals can be used. An increase in an electrode area of one layer causes a higher internal resistance; therefore, it is also acceptable that more than two terminals are provided in the electrode to decrease the resistance. When the electrode assembly has the foregoing winding structure, more than two lead structures are provided on each of the positive electrode and the negative electrode, and are bundled on the terminals, so as to reduce the internal resistance.

Outer Packing Case

The material of the outer packing case is not particularly limited provided that the material is a substance stable to the electrolyte in use. The outer packing case may use, but is not limited to a nickel-plated steel plate, stainless steel, metals such as aluminium, aluminum alloy, or magnesium alloy, or laminated films of resin and aluminum foil. In some embodiments, the outer packing case is made of metal including aluminum or an aluminum alloy, or be made of a laminated film.

The metal outer packing case includes, but is not limited to, a sealed packaging structure formed by depositing metals through laser welding, resistance welding, and ultrasonic welding; or a riveting structure formed by using the foregoing metal or the like with a resin pad disposed therebetween. The outer packing case using the laminated film includes, but is not limited to, a sealed packaging structure or the like formed by thermally adhering resin layers. In order to improve the sealing property, a resin different from the resin used in the laminated film may be sandwiched between the resin layers. When the sealed structure is formed by thermally adhering the resin layers through current collecting terminals, a resin having a polar group or a modified resin into which a polar group is introduced may be used as the sandwiched resin due to bonding of the metal and the resin. In addition, the shape of the outer packing case may be in any random shape, for example, in any one of a cylindrical shape, a square shape, a laminated shape, a button shape, and the like.

Protection Element

The protection element may use a positive temperature coefficient (PTC), a temperature fuse, and a thermistor whose resistance increases during abnormal heat release or excessive current flows, a valve (current cutoff valve) for cutting off a current flowing in a circuit by sharply increasing an internal pressure or an internal temperature of a battery during abnormal heat release or excessive current flow, or the like. The protection element may be selected for elements that do not operate in conventional high-current use scenarios, or may be designed so as not to cause abnormal heat release or thermal runaway even in the absence of the protection element.

VI. Application

The electrochemical apparatus in this application includes any apparatus on which electrochemical reactions occur. Its specific examples include all kinds of primary batteries, secondary batteries, fuel batteries, solar batteries, or capacitors. In particular, the electrochemical apparatus is a lithium secondary battery, including a lithium metal secondary battery or a lithium ion secondary battery.

This application further provides an electronic apparatus, including the electrochemical apparatus in this application.

Usage of the electrochemical apparatus in this application is not particularly limited. The electrochemical apparatus can be used in any electronic apparatus known in the prior art. In some embodiments, the electrochemical apparatus in this application may be used in, but being not limited to, a notebook computer, a pen-input computer, a mobile computer, an e-book player, a portable phone, a portable fax, a portable copier, a portable printer, a headphone stereo, a video recorder, an LCD TV, a handy cleaner, a portable CD player, a mini disk, a transceiver, an electronic notebook, a calculator, a memory card, a portable recorder, a radio, a backup power supply, a motor, a vehicle, a motorcycle, a power assisted cycle, a bicycle, a lighting appliance, a toy, a game player, a clock, an electric tool, a flash lamp, a camera, a large household battery, a lithium-ion capacitor, or the like.

The following uses the lithium-ion battery as an example to describe the preparation of the lithium-ion battery with reference to specific examples. Those skilled in the art can understand that the preparation method described in this application is merely an example, and any other appropriate preparation method falls within the scope of this application.

Examples

The following describes performance evaluation based on the examples and comparative examples of the lithium-ion battery of this application.

I. Preparation of the Lithium-Ion Battery

1. Preparation of the Negative Electrode

Artificial graphite, styrene-butadiene rubber, and sodium carboxymethylcellulose were mixed in deionized water based on a mass ratio of 96%:2%:2%. After stirring evenly, the negative electrode slurry was obtained. The negative electrode slurry was applied onto the current collector of 12 μm. The tensile strength of the negative electrode current collector and the weight per unit area of the negative electrode active substance layer were controlled based on settings of the following examples or comparative examples. Then, after steps of drying, cold pressing, cutting, and lug welding, the negative electrode was obtained.

2. Preparation of the Positive Electrode

Lithium cobaltate ($LiCoO_2$), conductive material (Super-P), and polyvinylidene fluoride (PVDF) were mixed in N-methylpyrrolidone (NMP) based on a mass ratio of 95%:2%:3%. After stirring evenly, a positive electrode slurry was obtained. The positive electrode slurry was applied onto an aluminum foil of 12 μm. After steps of drying, cold pressing, cutting, and lug welding, the positive electrode was obtained.

3. Preparation of the Electrolyte

Under a dry argon environment, EC, PC, and DEC (based on a weight ratio of 1:1:1) were mixed, and $LiPF_6$ was added. After mixing evenly, a base electrolyte was obtained, where the concentration of $LiPF_6$ was 1.15 mol/L. Different amounts of additives were added to the base electrolyte, to obtain different electrolytes used in different examples and comparative examples. Abbreviations and full names of compositions in the electrolyte are listed in the following table:

| Name of material | Abbreviation | Name of material | Abbreviation |
|---|---|---|---|
| Ethylene carbonate | EC | Propylene carbonate | PC |
| Ethyl methyl carbonate | EMC | Ethyl propionate | EP |
| Propyl propionate | PP | Adiponitrile | ADN |
| Succinonitrile | SN | 1,3,6-hexanetricarbonitrile | HTCN |
| Ethylene glycol di(2-cyanoethyl) ether | EDN | Lithium difluorophosphate | $LiPO_2F_2$ |
| 1,2,3-tris(2-cyanoethoxy) propane | TCEP | 1,2-ethylene sulfate | DTD |
| 1,3-propanesulfonate | PS | Formula 1-1 compound | Formula 1-1 |
| Formula 1-2 compound | Formula 1-2 | | |

4. Preparation of the Separator

A polyethylene (PE) porous polymer film was used as the separator.

5. Preparation of the Lithium-Ion Battery

The resulting positive electrode, separator, and negative electrode were wound in order and placed in an outer packing foil, leaving a liquid injection hole. After the steps of injecting the electrolyte into the liquid injection hole, packaging, aging, and capacity testing, the lithium-ion battery was obtained.

II. Test Method

1. Test Method for the High-Temperature Storage Swelling Rate of the Lithium-Ion Battery At 25° C., after standing for 30 minutes, the lithium-ion battery was charged to 4.45V at a constant current rate of 0.5 C, and then charged to 0.05 C at a constant voltage of 4.45V. After standing for five minutes, the thickness of the lithium-ion battery was measured. The thickness of the lithium-ion battery was measured again after 21 days of storage at 60° C. The high-temperature storage swelling rate of the lithium-ion battery was calculated by using the following formula:

High-temperature storage swelling rate=[(Thickness after storage-Thickness before storage)/Thickness before storage]×100%

2. Test Method for the Cycle Swelling Rate of the Lithium-Ion Battery

At 25° C., after standing for 30 minutes, the lithium-ion battery was charged to 4.45V at a constant current rate of 0.5 C, and then charged to 0.05 C at a constant voltage of 4.45V. After standing for five minutes, the thickness of the lithium-ion battery was measured. The lithium-ion battery was cycled 100 times under the same conditions, and then the thickness of the lithium-ion battery was measured. The cycle swelling rate of the lithium-ion battery was calculated by using the following formula:

Cycle swelling rate=[(Thickness after cycling-Thickness before cycling)/Thickness before cycling]×100%

3. Test Method for the Discharge Capacity Retention Rate of the Lithium-Ion Battery The lithium-ion battery was discharged to 3.0V at a constant current of 0.5 C, and after standing for five minutes, charged to 4.45V at a constant current of 0.5 C and charged to a cutoff current of 0.05 C at a constant voltage. After standing for five minutes, the lithium-ion battery was then discharged to a voltage of 3.0V separately at a constant current of 0.2 C and 5 C. The discharge capacity at 5 C was recorded as D1, and the discharge capacity at 0.2 C was recorded as D0. The discharge capacity retention rate of the lithium-ion battery at 5 C was calculated based on the discharge capacity at 0.2 C by using the following formula:

$$\text{Discharge Capacity Retention Rate}=[(D1-D0)/D0]\times 100\%$$

Five samples were tested in each example or comparative example and an average value was obtained.

III. Test Results

Table 1 shows the impact of the tensile strength of the negative electrode current collector and the weight per unit area of the negative electrode active substance layer on the high-temperature storage swelling rate and the cycle swelling rate of the lithium-ion battery.

TABLE 1

| | F ($N/mm^2$) | W ($mg/cm^2$) | First metal: Type | First metal: Content percentage a (%) | F × a | F/W | High-temperature storage swelling rate | Cycle swelling rate |
|---|---|---|---|---|---|---|---|---|
| Comparative Example 1-1 | 200 | 2 | / | / | 0 | 100 | 22.3% | 24.6% |
| Comparative Example 1-2 | 200 | 4 | / | / | 0 | 50 | 21.5% | 28.3% |
| Comparative Example 1-3 | 200 | 15 | / | / | 0 | 13.3 | 15.7% | 22.1% |
| Comparative Example 1-4 | 400 | 2 | Tin | 0.1 | 40 | 200 | 20.9% | 23.5% |
| Comparative Example 1-5 | 400 | 15 | Tin | 0.1 | 40 | 26.7 | 23.6% | 31.5% |
| Example 1-1 | 400 | 3 | Tin | 0.005 | 2 | 133.3 | 12.8% | 16.7% |
| Example 1-2 | 400 | 7 | Tin | 0.01 | 4 | 57.1 | 9.7% | 11.3% |
| Example 1-3 | 400 | 12 | Tin | 0.1 | 40 | 33.33 | 9.9% | 11.8% |
| Example 1-4 | 500 | 3 | Tin + silver | 0.05 + 0.05 | 50 | 166.7 | 9.7% | 9.5% |
| Example 1-5 | 500 | 7 | Tin + silver | 0.05 + 0.05 | 50 | 71.4 | 9.2% | 9.3% |
| Example 1-6 | 600 | 3 | Tin + silver | 0.1 + 0.1 | 120 | 200 | 9.3% | 9.9% |
| Example 1-7 | 1000 | 7 | Tin + silver | 0.1 + 0.1 | 200 | 142.9 | 9.1% | 8.5% |
| Example 1-8 | 800 | 3.6 | Tin + silver | 0.1 + 0.1 | 160 | 222.2 | 14.2% | 16.6% |
| Example 1-9 | 1000 | 4.5 | Tin + silver | 0.1 + 0.12 | 220 | 222.2 | 15.1% | 17.5% |
| Example 1-10 | 400 | 7 | silver | 0.1 | 4 | 57.1 | 9.5% | 11.1% |
| Example 1-11 | 400 | 7 | silver | 0.5 | 20 | 57.1 | 10.1% | 12.4% |
| Example 1-12 | 400 | 7 | silver | 0.8 | 32 | 57.1 | 11.5% | 13.7% |

"/" means no addition or not having such property.

The results show that when the tensile strength of the negative electrode current collector in the electrochemical apparatus is greater than 400 $N/mm^2$ and the weight per unit area of the negative electrode active substance layer is 3 $mg/cm^2$ to 12 $mg/cm^2$, swelling or contraction of the negative electrode resulting from charging and discharging of the electrochemical apparatus is suppressed to help stabilize the structure of the negative electrode active substance layer, thereby significantly reducing the high-temperature storage swelling rate and the cycle swelling rate of the lithium-ion battery.

When the negative electrode current collector contains 0.01% to 0.5% of the first metal (silver and/or tin), the high-temperature storage swelling rate and the cycle swelling rate of the lithium-ion battery can be further decreased.

When the tensile strength F N/$mm^2$ of the negative electrode current collector and the content a % of the first metal in the negative electrode current collector satisfy $4 \leq F \times a \leq 200$, the high-temperature storage swelling rate and the cycle swelling rate of the lithium-ion battery can be further decreased.

When the tensile strength F N/$mm^2$ of the negative electrode current collector and the weight per unit area W mg/$cm^2$ of the negative electrode active substance layer satisfy $100/3 \leq F/W \leq 200$, the high-temperature storage swelling rate and the cycle swelling rate of the lithium-ion battery can be further decreased.

Table 2 shows the impact of the relationship between the density D g/$cm^3$ of the negative electrode active substance layer and the tensile strength F N/$mm^2$ of the negative electrode current collector on the high-temperature storage swelling rate and the cycle swelling rate of the lithium-ion battery performance. Examples 2-1 to 2-11 differ from Examples 1-1 and 1-5 only in the parameters listed in Table 2.

TABLE 2

| | Negative electrode current collector | F (N/$mm^2$) | D (g/$cm^3$) | F × D | High-temperature storage | Cycle swelling rate |
|---|---|---|---|---|---|---|
| Example 1-1 | Copper foil containing 0.005% tin | 400 | 1.2 | 480 | 12.8% | 16.7% |
| Example 1-5 | Copper foil containing 0.1% tin and 0.1% silver | 500 | 1.6 | 800 | 9.2% | 9.3% |
| Example 2-1 | Copper foil containing 0.1% tin and 0.1% silver | 400 | 1.4 | 560 | 9.6% | 9.9% |
| Example 2-2 | Copper foil containing 0.1% tin and 0.1% silver | 500 | 1.7 | 850 | 9.1% | 9.2% |
| Example 2-3 | Copper foil containing 0.1% tin and 0.1% silver | 500 | 1.75 | 875 | 8.9% | 8.5% |
| Example 2-4 | Copper foil containing 0.1% tin and 0.1% silver | 500 | 1.8 | 900 | 8.8% | 8.3% |
| Example 2-5 | Copper foil containing 0.1% tin and 0.2% silver | 500 | 1.7 | 850 | 9.2% | 9.5% |
| Example 2-6 | Copper foil containing 0.001% scandium and 0.1% tin | 550 | 1.7 | 935 | 9.1% | 9.5% |
| Example 2-7 | Copper foil containing 0.001% yttrium and 0.1% tin | 750 | 1.6 | 1200 | 9.1% | 8.9% |
| Example 2-8 | Copper foil containing 0.005% tin | 400 | 1.6 | 640 | 8.8% | 8.7% |

TABLE 2-continued

| | Negative electrode current collector | F (N/$mm^2$) | D (g/$cm^3$) | F × D | High-temperature storage | Cycle swelling rate |
|---|---|---|---|---|---|---|
| Example 2-9 | Copper foil containing 0.1% tin and 0.1% silver | 400 | 2.0 | 800 | 10.8% | 11.3% |
| Example 2-10 | Copper foil containing 0.1% tin and 0.1% silver | 400 | 2.2 | 880 | 11.5% | 12.7% |
| Example 2-11 | Copper foil with 0.005% yttrium and 0.1% tin | 750 | 1.8 | 1350 | 12.3% | 14.5% |

The results show that when the negative electrode current collector further includes the first metal (tin and/or silver) or a combination of the first metal and the rare earth element, the high-temperature storage swelling rate and the cycle swelling rate of the lithium-ion battery can be further decreased. When the tensile strength F N/$mm^2$ of the negative electrode current collector and the density D g/$cm^3$ (D is 1.4 to 2.0) of the negative electrode active substance layer satisfy $560 \leq F \times D \leq 1200$, the high-temperature storage swelling rate and the cycle swelling rate of the lithium-ion battery can be further decreased.

Table 3 further shows the impact of the thickness and 0.2% endurance of the negative electrode current collector on the high-temperature storage swelling rate and cycle swelling rate of the lithium-ion battery. Examples 3-1 to 3-4 differ from Example 1-1 only in the parameters listed in Table 3.

TABLE 3

| | Thickness (μm) | 0.2% endurance (N/$mm^2$) | High-temperature storage swelling rate | Cycle swelling rate |
|---|---|---|---|---|
| Example 1-1 | 12 | 25 | 12.8% | 16.7% |
| Example 3-1 | 12 | 30 | 9.3% | 9.5% |
| Example 3-2 | 12 | 70 | 8.1% | 7.5% |
| Example 3-3 | 15 | 80 | 8.7% | 7.9% |
| Example 3-4 | 20 | 90 | 8.5% | 7.6% |

As shown in Table 3, the negative electrode current collector may have the following characteristics: 0.2% endurance is greater than 30 N/$mm^2$ and/or the thickness is 1 μm to 100 μm. When the negative electrode current collector has 0.2% endurance and/or thickness within the foregoing ranges, the high-temperature storage swelling rate and the cycle swelling rate of the lithium-ion battery can be further decreased. Table 4 further shows the impact of the negative electrode active substance and the reflectance Ra of the negative electrode active substance layer at a wavelength of 550 nm on the high-temperature storage swelling rate, the cycle swelling rate, and the discharge capacity retention rate of the lithium-ion battery. Examples 4-1 to 4-6 differ from Example 1-1 only in the parameters listed in Table 4.

TABLE 4

| | Negative electrode active substance | Ra | Discharge capacity retention rate | High-temperature storage swelling rate | Cycle swelling rate |
|---|---|---|---|---|---|
| Example 1-1 | Artificial graphite | 6.5% | 55.3% | 12.8% | 16.7% |
| Example 4-1 | 80% artificial graphite + 20% natural graphite | 7.5% | 62.3% | 8.1% | 8.5% |
| Example 4-2 | Mesophase carbon microsphere | 8% | 65.5% | 6.3% | 7.1% |
| Example 4-3 | 80% artificial graphite + 20% silicon carbide | 7.5% | 68.9% | 10.5% | 11.3% |
| Example 4-4 | 80% artificial graphite + 20% silica | 9.5% | 71.2% | 10.1% | 10.9% |
| Example 4-5 | 80% artificial graphite + 20% hard carbon | 15% | 75.6% | 6.5% | 7.0% |
| Example 4-6 | 60% artificial graphite + 40% hard carbon | 17.5% | 63.8% | 10.8% | 11.6% |

The results show that, when different negative electrode active substances are used to make the reflectance Ra of the negative electrode active substance layer at the wavelength of 550 nm be 7% to 15%, the high-temperature storage swelling rate and the cycle swelling rate of the lithium-ion battery can be further decreased and the discharge capacity retention rate of the lithium-ion battery can be significantly increased.

Table 5 shows the impact of the composition of the electrolyte on the high-temperature storage swelling rate and the cycle swelling rate of the lithium-ion battery. Examples 5-1 to 5-35 differ from Example 1-1 only in the parameters listed in Table 5.

TABLE 5

| | Compositin of electrolyte | | | | Performance of the lithium-ion battery | |
|---|---|---|---|---|---|---|
| | Propionate (20%) | Organic compound having cyano group (2%) | $LiPO_2F_2$ (0.5%) | Compound of Formula 1 (1%) | High-temperature storage swelling rate | Cycle swelling rate |
| Example 1-1 | / | / | / | / | 12.8% | 16.7% |
| Example 5-1 | PP | / | / | / | 9.2% | 8.5% |
| Example 5-2 | / | SN | / | / | 8.2% | 7.8% |
| Example 5-3 | / | ADN | / | / | 8.3% | 8.1% |
| Example 5-4 | / | EDN | / | / | 8.2% | 7.5% |
| Example 5-5 | / | HTCN | / | / | 8.1% | 7.2% |
| Example 5-6 | / | TCEP | / | / | 8.2% | 7.3% |
| Example 5-7 | / | / | $LiPO_2F_2$ | / | 8.5% | 8.7% |
| Example 5-8 | / | / | / | Formula 1-1 | 8.4% | 8.1% |
| Example 5-9 | PP | SN | / | / | 7.8% | 7.5% |
| Example 5-10 | PP | ADN | / | / | 7.1% | 7.1% |
| Example 5-11 | PP | EDN | / | / | 7.9% | 7.8% |
| Example 5-12 | PP | HTCN | / | / | 6.5% | 7.7% |
| Example 5-13 | PP | TCEP | / | / | 6.1% | 7.6% |
| Example 5-14 | / | SN | $LiPO_2F_2$ | / | 6.8% | 7.5% |
| Example 5-15 | / | SN | / | Formula 1-1 | 7.3% | 7.7% |
| Example 5-16 | / | ADN | $LiPO_2F_2$ | / | 7.0% | 7.6% |
| Example 5-17 | / | ADN | / | Formula 1-1 | 6.8% | 7.5% |
| Example 5-18 | / | EDN | $LiPO_2F_2$ | / | 6.2% | 7.1% |
| Example 5-19 | / | EDN | / | Formula 1-1 | 5.8% | 7.0% |
| Example 5-20 | / | HTCN | $LiPO_2F_2$ | / | 5.4% | 7.9% |
| Example 5-21 | / | HTCN | / | Formula 1-1 | 7.1% | 7.8% |
| Example 5-22 | / | TCEP | $LiPO_2F_2$ | / | 6.6% | 7.0% |
| Example 5-23 | / | TCEP | / | Formula 1-1 | 6.3% | 7.9% |
| Example 5-24 | PP | SN | $LiPO_2F_2$ | / | 5.5% | 6.2% |
| Example 5-25 | PP | SN | / | Formula 1-1 | 6.0% | 6.4% |
| Example 5-26 | PP | ADN | $LiPO_2F_2$ | / | 5.7% | 6.3% |
| Example 5-27 | PP | ADN | / | Formula 1-1 | 5.5% | 6.2% |
| Example 5-28 | PP | EDN | $LiPO_2F_2$ | / | 5.9% | 6.8% |
| Example 5-29 | PP | EDN | | Formula 1-1 | 5.5% | 6.7% |
| Example 5-30 | PP | HTCN | $LiPO_2F_2$ | / | 5.1% | 6.6% |
| Example 5-31 | PP | HTCN | / | Formula 1-1 | 5.8% | 6.5% |
| Example 5-32 | PP | TCEP | $LiPO_2F_2$ | / | 5.3% | 6.7% |
| Example 5-33 | PP | TCEP | / | Formula 1-1 | 5.0% | 6.6% |
| Example 5-34 | PP | HTCN | $LiPO_2F_2$ | Formula 1-1 | 3.8% | 6.1% |
| Example 5-35 | PP | TCEP | $LiPO_2F_2$ | Formula 1-2 | 3.1% | 5.6% |

"/" means no addition or not having such property.

The results show that, on the basis that the tensile strength of the negative electrode current collector is greater than 400 N/mm$^2$ and the weight per unit area of the negative electrode active substance layer is 3 mg/cm$^2$ to 12 mg/cm$^2$, when the electrolyte contains propionate, the organic compound having cyano group, lithium difluorophosphate, and/or the compound of the formula 1, the high-temperature storage swelling rate and the cycle swelling rate of the lithium-ion battery can be further decreased.

Table 6 shows the impact of the relationship between the content a % of the first metal in the negative electrode current collector and the content b % of the compound having cyano group in the electrolyte on the high-temperature storage swelling rate and the cycle swelling rate of the lithium-ion battery. Examples 6-1 to 6-10 differ from Example 1-1 only in the parameters listed in Table 6.

TABLE 6

| | First metal | | | | High-temperature | |
|---|---|---|---|---|---|---|
| | Type | Content percentage a (%) | b (%) | b/a | storage swelling rate | Cycle swelling rate |
| Example 1-1 | Tin | 0.005 | 7.5 | 1500 | 12.8% | 16.7% |
| Example 6-1 | Tin | 0.10 | 4 | 40 | 8.1% | 8.3% |
| Example 6-2 | Tin | 0.15 | 4 | 26.7 | 7.8% | 8.2% |
| Example 6-3 | Tin | 0.20 | 4 | 20 | 9.2% | 9.5% |
| Example 6-4 | Tin | 0.25 | 4 | 16 | 10.1% | 9.5% |
| Example 6-5 | Tin | 0.25 | 0.25 | 1 | 11.7% | 13.2% |
| Example 6-6 | Tin | 0.01 | 3 | 300 | 12.1% | 13.5% |
| Example 6-7 | Silver | 0.02 | 0.01 | 0.5 | 14.3% | 15.2% |
| Example 6-8 | Silver | 0.02 | 0.008 | 0.4 | 15.1% | 15.9% |
| Example 6-9 | Silver | 0.02 | 10 | 500 | 15.4% | 15.1% |
| Example 6-10 | Silver | 0.02 | 12 | 600 | 16.3% | 16.2% |

The results show that when the content of the compound having cyano group in the electrolyte is 0.01% to 10%, the high-temperature storage swelling rate and the cycle swelling rate of the lithium-ion battery can be further decreased.

When the content a % of the first metal in the negative electrode current collector and the content b % of the compound having cyano group in the electrolyte satisfy $1 \leq b/a \leq 300$, the high-temperature storage swelling rate and the circulation swelling rate of the lithium-ion battery can be further decreased.

Table 7 shows the impact of the relationship between the content b % of the compound having cyano group in the electrolyte and the weight per unit area W mg/$cm^2$ of the negative electrode active substance layer on the high-temperature storage swelling rate and the cycle swelling rate of the lithium-ion battery. Examples 7-1 to 7-6 differ from Example 1-1 only in the parameters listed in Table 7.

TABLE 7

| | b (%) | W (mg/$cm^2$) | W/b | High-temperature storage swelling rate | Cycle swelling rate |
|---|---|---|---|---|---|
| Example 1-1 | 7.5 | 3 | 0.4 | 12.8% | 16.7% |
| Example 7-1 | 4 | 7 | 1.75 | 7.2% | 7.5% |
| Example 7-2 | 5 | 7 | 1.4 | 7.3% | 7.5% |
| Example 7-3 | 6 | 3 | 0.5 | 7.5% | 7.4% |
| Example 7-4 | 4 | 12 | 3 | 7.7% | 7.3% |
| Example 7-5 | 0.625 | 15 | 24 | 9.8% | 9.1% |
| Example 7-6 | 0.5 | 15 | 30 | 13.5% | 17.9% |

The results show that when the content b % of the compound having cyano group in the electrolyte and the weight per unit area W mg/$cm^2$ of the negative electrode active substance layer satisfy $0.5 \leq W/b \leq 24$, the high-temperature storage swelling rate and the cycle swelling rate of the lithium-ion battery can be further decreased.

In this specification, reference to "embodiments", "an embodiment", "another example", "examples", "specific examples", or "some examples" means that at least one embodiment or example in this application includes a specific feature, structure, material, or characteristic described in this embodiment or example. Therefore, descriptions that appear in various parts of this specification, such as "in some embodiments", "in the embodiments", "in an embodiment", "in another example", "in an example", "in a specific example", or "examples" do not necessarily reference the same embodiment or example in this application. In addition, a specific feature, structure, material, or property herein may be combined in any appropriate manner in one or more embodiments or examples.

Although illustrative embodiments have been demonstrated and described, those skilled in the art should understand that the foregoing embodiments are not to be construed as limiting this application, and that the embodiments may be changed, replaced, and modified without departing from the spirit, principle, and scope of this application.

What is claimed is:

1. An electrochemical apparatus, comprising: a positive electrode, a negative electrode, and an electrolyte; wherein the negative electrode comprises a negative electrode current collector and a negative electrode active substance layer formed on the negative electrode current collector;

wherein the negative electrode current collector has a tensile strength of F N/$mm^2$, wherein F is greater than 400;

wherein a weight per unit area of the negative electrode active substance layer is W mg/$cm^2$, wherein W is within a range of 3 to 12;

wherein a density of the negative electrode active substance layer is D g/$cm^3$, and D is within a range of 1.7 to 2.0, wherein $900 \leq F \times D \leq 1200$;

wherein the electrolyte comprises a compound having cyano group, and wherein based on a weight of the electrolyte, a content percentage of the compound having cyano group is b % and b is within a range of 3.5 to 10, wherein the negative electrode current collector comprises copper and a first metal, the first metal comprises silver and tin, and based on the weight of the negative electrode current collector, a content percentage of the first metal is a %, wherein a is within a range of 0.01 to 0.5;

wherein the negative electrode current collector further comprises at least one rare earth element, and the rare earth element comprises yttrium.

2. The electrochemical apparatus according to claim 1, wherein $4 \leq F \times a \leq 200$.

3. The electrochemical apparatus according to claim 1, wherein $100/3 \leq F/W \leq 200$.

4. The electrochemical apparatus according to claim 1, wherein the negative electrode current collector has at least one of the following characteristics:

1) An average surface roughness is 0.05 μm to 1.5 μm;

2) a 0.2% endurance is greater than 30 N/$mm^2$; or 3) a thickness is 1 μm to 100 μm.

5. The electrochemical apparatus according to claim 1, wherein the negative electrode active substance layer has at least one of the following characteristics:

a) a reflectance Ra at a wavelength of 550 nm is 7% to 15%; or b) a porosity Pa is 20% to 40%.

6. The electrochemical apparatus according to claim 1, wherein the electrolyte further comprises at least one of the following compounds:

i. propionate;

ii. lithium difluorophosphate; or iii. a compound of Formula 1:

Formula 1

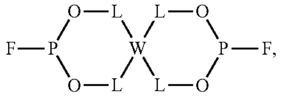

wherein,

W is

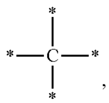,
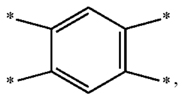,
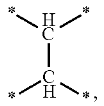, or
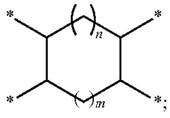;

each L is independently a single bond or methylene;

m is 1, 2, 3, or 4; and n is 0, 1, or 2.

7. The electrochemical apparatus according to claim 6, wherein the compound of Formula 1 comprises at least one of the following compounds:

Formula 1-1

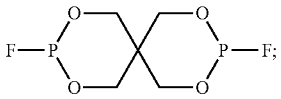

or

Formula 1-2

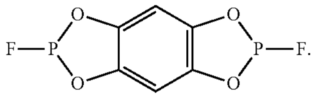

8. The electrochemical apparatus according to claim 6, wherein $1 \leq b/a \leq 300$.

9. The electrochemical apparatus according to claim 6, wherein $0.5 \leq W/b \leq 24$.

10. An electronic apparatus, comprising: an electrochemical apparatus; wherein the electrochemical apparatus comprises a positive electrode, a negative electrode, and an electrolyte; the negative electrode comprises a negative electrode current collector and a negative electrode active substance layer formed on the negative electrode current collector;

wherein the negative electrode current collector has a tensile strength of F $N/mm^2$, wherein F is greater than 400;

wherein a weight per unit area of the negative electrode active substance layer is W $mg/cm^2$, wherein W is within a range of 3 to 12;

wherein a density of the negative electrode active substance layer is D $g/cm^3$, and D is within a range of 1.7 to 2.0, wherein $900 \leq F \times D < 1200$;

wherein the electrolyte comprises a compound having cyano group, and wherein based on a weight of the electrolyte, a content percentage of the compound having cyano group is b % and b is within a range of 3.5 to 10, wherein the negative electrode current collector comprises copper and a first metal, the first metal comprises silver and tin, and based on the weight of the negative electrode current collector, a content percentage of the first metal is a %, wherein a is within a range of 0.01 to 0.5; and wherein the negative electrode current collector further comprises at least one rare earth element, and the rare earth element comprises yttrium.

11. The electronic apparatus according to claim 10, wherein $100/3 \leq F/W \leq 200$.

12. The electronic apparatus according to claim 10, wherein the negative electrode current collector has at least one of the following characteristics:

1) An average surface roughness is 0.05 μm to 1.5 μm;

2) a 0.2% endurance is greater than 30 $N/mm^2$; or 3) a thickness is 1 μm to 100 μm.

13. The electrochemical apparatus according to claim 1, wherein b is within a range of 7.5 to 10.

* * * * *